US012609887B2

(12) United States Patent
Hao et al.

(10) Patent No.: US 12,609,887 B2
(45) Date of Patent: Apr. 21, 2026

(54) ROUTE PROCESSING METHOD, RELATED APPARATUS, AND NETWORK SYSTEM

(71) Applicant: Huawei Technologies Co., Ltd., Shenzhen (CN)

(72) Inventors: Weiguo Hao, Nanjing (CN); Haibo Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 364 days.

(21) Appl. No.: 18/342,368

(22) Filed: Jun. 27, 2023

(65) Prior Publication Data

US 2023/0344751 A1 Oct. 26, 2023

Related U.S. Application Data

(63) Continuation of application No. PCT/CN2021/133836, filed on Nov. 29, 2021.

(30) Foreign Application Priority Data

Dec. 28, 2020 (CN) .......................... 202011582001.3
Jan. 22, 2021 (CN) .......................... 202110090580.8

(51) Int. Cl.
*H04L 45/00* (2022.01)
*H04L 45/02* (2022.01)

(52) U.S. Cl.
CPC .............. *H04L 45/20* (2013.01); *H04L 45/02* (2013.01)

(58) Field of Classification Search
None
See application file for complete search history.

(56) References Cited

U.S. PATENT DOCUMENTS 5,917,820 A * 6/1999 Rekhter .................. H04L 45/00
370/392
9,838,246 B1 * 12/2017 Hegde ..................... H04L 45/28
(Continued)

FOREIGN PATENT DOCUMENTS

CN 101133596 A 2/2008
CN 106059924 A 10/2016
WO 2007041926 A1 4/2007

OTHER PUBLICATIONS

Vairavakkalai M Jeyananth Juniper Networks K et al: "BGP signalled private MPLS-labels; draft-kaliraj-bess-bgp-sig-private-mpls-labels-00.txt", Internet-Draft: Network Working Group, Internet Engineering Task Force, IETF: Standard Working Draft, Internet Society (ISOC) 4, Rue Des Falaises CH-1205 Geneva, Jun. 22, 2017 (Jun. 22, 2017), pp. 1-15, XP015120274.

(Continued)

*Primary Examiner* — Xavier S Wong
(74) *Attorney, Agent, or Firm* — Slater Matsil, LLP

(57) ABSTRACT

A first network device obtains a first route, where a first route prefix of the first route includes an identifier of a route advertiser. The first network device generates a first route entry based on the first route. The first network device obtains a second route, where the second route includes a second route prefix and the identifier of the route advertiser. The first network device generates a second route entry based on the identifier of the route advertiser and the second route prefix, to associate the first route entry with the second route entry.

20 Claims, 11 Drawing Sheets

(56) References Cited

U.S. PATENT DOCUMENTS

| | | | |
|---|---|---|---|
| 11,855,877 B2* | 12/2023 | Yan | H04L 45/745 |
| 2007/0104106 A1 | 5/2007 | Patel et al. | |
| 2015/0009803 A1* | 1/2015 | Bashandy | H04L 45/22 |
| | | | 370/219 |
| 2018/0091420 A1* | 3/2018 | Drake | H04L 45/033 |
| 2020/0067822 A1* | 2/2020 | Malhotra | G06F 16/278 |

OTHER PUBLICATIONS

Patel, K. et al., "Shortest Path Routing Extensions for BGP Protocol", draft-letf-lsvr-bgp-spf-11, Aug. 3, 2020, 23 pages.
Rekhter, Y., Ed. et al., "A Border Gateway Protocol 4 (BGP-4)", https://datatracker.ietf.org/doc/html/rfo4271, Jan. 2006, 104 pages.
Patel, K. et al., "Shortest Path Routing Extensions for BGP Protocol", draft-letf-lsvr-bgp-spf-04.txt, Dec. 20, 2018, 22 pages.

* cited by examiner spine: spine switch     spuer spine: super spine switch     leaf: leaf switch     POD: point of deliver     server: server

200

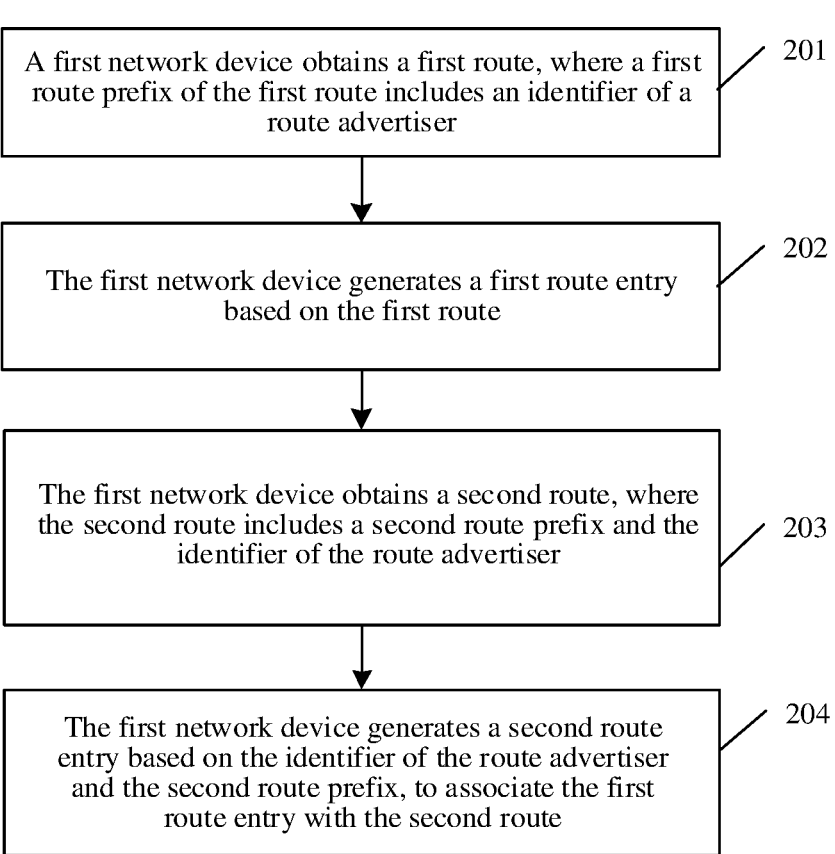

A first network device obtains a first route, where a first route prefix of the first route includes an identifier of a route advertiser    201

The first network device generates a first route entry based on the first route    202

The first network device obtains a second route, where the second route includes a second route prefix and the identifier of the route advertiser    203

The first network device generates a second route entry based on the identifier of the route advertiser and the second route prefix, to associate the first route entry with the second route    204

FIG. 2

| AttrFlag (Attribute flag) | Type (Type) | len (Length) |
|---|---|---|
| Feature Code Point (Feature code point) | | |
| Version Number (Version number) | | Length (Length) |
| Subval (Subvariable) | | |

FIG. 3a

| sub-type (sub-type) | len (length) | Flag (flag) | mask (mask) |
|---|---|---|---|
| Prefix (prefix) | | | |

FIG. 3b

| sub-type: 1 | len: 2 | Flag: 0000 0000 | mask: 0 |
|---|---|---|---|

(a)

| sub-type: 1 | len: 2 | Flag: 1000 0000 | mask: 0 |
|---|---|---|---|

(b)

| sub-type: 1 | len: 6 | Flag: 0100 0000 | mask: 32 |
|---|---|---|---|
| Prefix: 1.1.1.1 | | | |

(c)

| Sub-type: 1 | len: 2 | Flag: 1100 0000 | mask: 128 |
|---|---|---|---|
| Prefix: 1001::1 | | | |

Table 1                          Table 2

| Route prefix | Basic next-hop index |
|---|---|
| 1.1.1.1/32 | Index1 |
| ... | ... |

| Basic next-hop index | Outbound interface and next-hop address |
|---|---|
| Index1 | Interface 1, 192.168.5.1 |
| ... | ... |

FIG. 4

Table 1

| Route prefix | Basic next-hop index |
|---|---|
| 1.1.1.1/32 | Index 1 |
| 10.1.1.0/24 | Index 1 |
| ... | ... |

Table 2

| Basic next-hop index | Outbound interface and next-hop address |
|---|---|
| Index 1 | Interface 1, 192.168.5.1 |
| ... | ... |

FIG. 5a

Table 1

| Route prefix | Basic next-hop index |
|---|---|
| 1.1.1.1/32 | Index 1 |
| ... | ... |

Table 2

| Basic next-hop index | Outbound interface and next-hop address |
|---|---|
| Index 1 | Interface 1, 192.168.5.1 |
| ... | ... |

Table 3

| Route prefix | Basic next-hop index |
|---|---|
| 10.1.1.0/24 | Index 1 |
| ... | ... |

FIG. 5b

Table 2

| Basic next-hop index | Outbound interface and next-hop address |
|---|---|
| Index1 | Interface 1, 192.168.5.1<br>Interface 2, 192.168.5.2 |
| Index2 | Interface 1, 192.168.5.1 |
| Index3 | Interface 1, 192.168.5.1 |
| Index4 | Interface 2, 192.168.5.2 |
| Index5 | Interface 2, 192.168.5.2 |
| ... | ... |

Index table

| Basic next-hop index | Direct next-hop index |
|---|---|
| Index1 | 1 |
| Index2 | 2 |
| Index3 | 2 |
| Index4 | 3 |
| Index5 | 3 |
| ... | ... |

Next-hop table

| Direct next-hop index | Outbound interface and next-hop address |
|---|---|
| 1 | Interface 1, 192.168.5.1<br>Interface 2, 192.168.5.2 |
| 2 | Interface 1, 192.168.5.1 |
| 3 | Interface 2, 192.168.5.2 |

FIG. 6

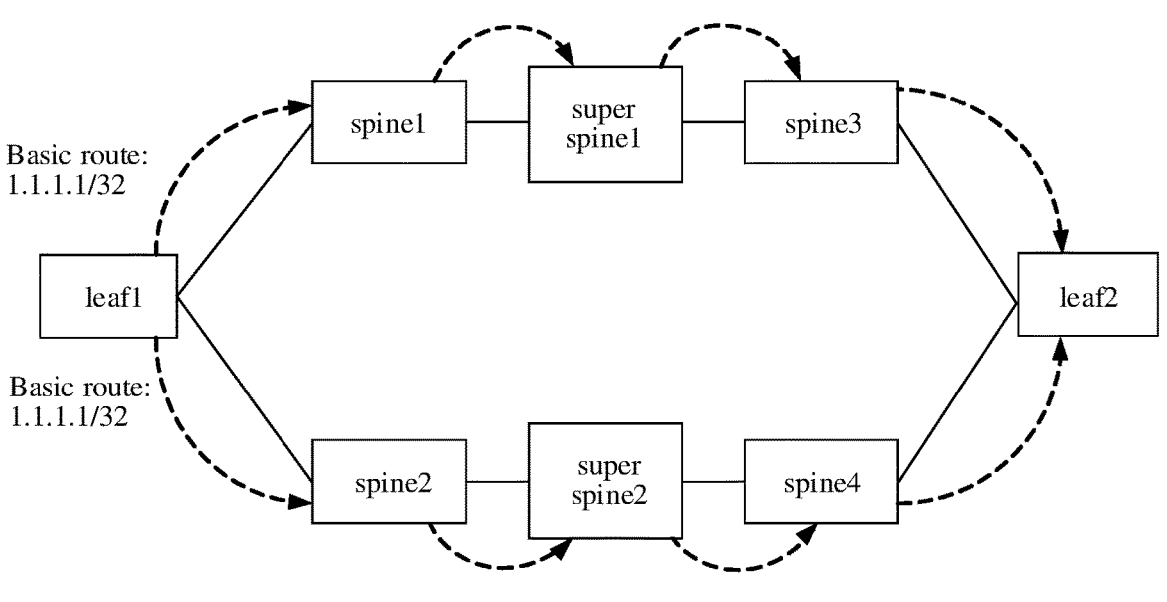
Basic route:
1.1.1.1/32
Basic route:
1.1.1.1/32
FIG. 7
Table 4
| Route prefix | Basic next-hop index |
|---|---|
| 1.1.1.1/32 | Index1 |
| ... | ... |
Table 5
| Basic next-hop index | Direct next-hop index |
|---|---|
| Index1 | 1 |
| ... | ... |
Table 6
| Direct next-hop index | Outbound interface and next-hop address |
|---|---|
| 1 | Interface 1, 192.168.3.1 Interface 2, 192.168.4.1 |
| ... | ... |
FIG. 8
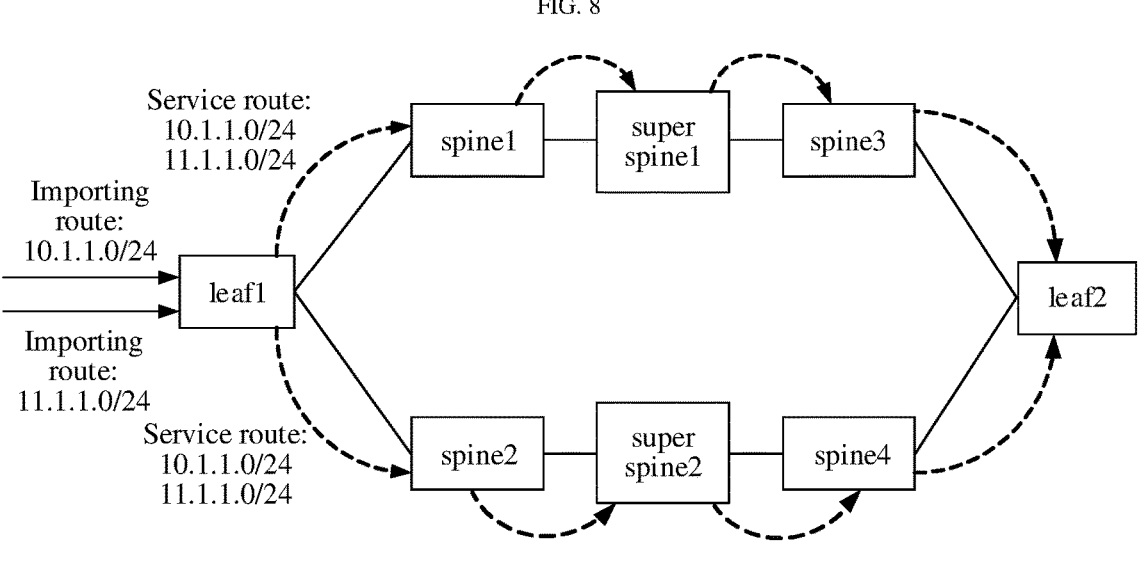
Service route:
10.1.1.0/24
11.1.1.0/24
Importing route:
10.1.1.0/24
Importing route:
11.1.1.0/24
Service route:
10.1.1.0/24
11.1.1.0/24
FIG. 9

Table 4

| Route prefix | Basic next-hop index |
|---|---|
| 1.1.1.1/32 | Index 1 |
| 10.1.1.1/24 | Index 1 |
| 11.1.1.1/24 | Index 1 |
| ... | ... |

Table 5

| Basic next-hop index | Direct next-hop index |
|---|---|
| Index 1 | 1 |
| ... | ... |

Table 6

| Direct next-hop index | Outbound interface and next-hop address |
|---|---|
| 1 | Interface 1, 192.168.3.1<br>Interface 2, 192.168.4.1 |
| ... | ... |

FIG. 10

Table 4

| Route prefix | Basic next-hop index |
|---|---|
| 1.1.1.1/32 | Index 1 |
| 10.1.1.1/24 | Index 1 |
| 11.1.1.1/24 | Index 1 |
| ... | ... |

Table 5

| Basic next-hop index | Direct next-hop index |
|---|---|
| Index 1 | 2 |
| ... | ... |

Table 6

| Direct next-hop index | Outbound interface and next-hop address |
|---|---|
| 1 | Interface 1, 192.168.3.1<br>Interface 2, 192.168.4.1 |
| 2 | Interface 2, 192.168.4.1 |
| ... | ... |

FIG. 11

Table 7

| Route prefix | Basic next-hop index |
|---|---|
| 1.1.1.1/32 | Index 1 |
| 2.2.2.2/32 | Index 2 |
| ... | ... |

Table 8

| Basic next-hop index | Direct next-hop index |
|---|---|
| Index 1 | 1 |
| Index 2 | 1 |
| ... | ... |

Table 9

| Direct next-hop index | Outbound interface and next-hop address |
|---|---|
| 1 | Interface 3, 192.168.5.1 Interface 4, 192.168.6.1 |
| ... | ... |

Table 7

| Route prefix | Basic next-hop index |
|---|---|
| 1.1.1.1/32 | Index1 |
| 2.2.2.2/32 | Index2 |
| 10.1.1.0/32 | Index3 |
| 11.1.1.0/32 | Index3 |
| ... | ... |

Table 8

| Basic next-hop index | Direct next-hop index |
|---|---|
| Index1 | 1 |
| Index2 | 1 |
| Index3 | 1 (1.1.1.1/32) |
| | 1 (2.2.2.2/32) |
| ... | ... |

Table 9

| Direct next-hop index | Outbound interface and next-hop address |
|---|---|
| 1 | Interface 3, 192.168.5.1 Interface 4, 192.168.6.1 |
| ... | ... |

FIG. 14

Table 7

| Route prefix | Basic next-hop index |
|---|---|
| 1.1.1.1/32 | Index1 |
| 2.2.2.2/32 | Index2 |
| 10.1.1.0/32 | Index3 |
| 11.1.1.0/32 | Index3 |
| ... | ... |

Table 8

| Basic next-hop index | Direct next-hop index |
|---|---|
| Index1 | 1 |
| Index2 | 1 |
| Index3 | 1000 (1.1.1.1/32) |
| | 1 (2.2.2.2/32) |
| ... | ... |

Table 9

| Direct next-hop index | Outbound interface and next-hop address |
|---|---|
| 1 | Interface 3, 192.168.5.1 Interface 4, 192.168.6.1 |
| 1000 | Interface 4, 192.168.6.1 |
| ... | ... |

FIG. 15

Table 7

| Route prefix | Basic next-hop index |
|---|---|
| 2.2.2.2/32 | Index2 |
| 10.1.1.0/32 | Index2 |
| 11.1.1.0/32 | Index2 |
| ... | ... |

Table 8

| Basic next-hop index | Direct next-hop index |
|---|---|
| Index2 | 1 |
| ... | ... |

Table 9

| Direct next-hop index | Outbound interface and next-hop address |
|---|---|
| 1 | Interface 3, 192.168.5.1 Interface 4, 192.168.6.1 |
| ... | ... |

1800

ROUTE PROCESSING METHOD, RELATED APPARATUS, AND NETWORK SYSTEM

CROSS-REFERENCE TO RELATED APPLICATIONS

This application is a continuation of International Application No. PCT/CN2021/133836, filed on Nov. 29, 2021, which claims priority to Chinese Patent Application No. 202011582001.3, filed on Dec. 28, 2020 and Chinese Patent Application No. 202110090580.8, filed on Jan. 22, 2021. All of the aforementioned patent applications are hereby incorporated by reference in their entireties.

TECHNICAL FIELD

This application relates to the field of communication technologies, and in particular, to a route processing method, a related apparatus, and a network system.

BACKGROUND

Currently, in some large data centers, a route protocol used is usually a direct hop-by-hop border gateway protocol (BGP). That is, the direct hop-by-hop BGP runs between network devices in the data centers. When a BGP route is propagated between network devices, the network devices change a next-hop of the BGP route hop by hop.

In a data center running BGP, each network device advertises only a local best path to a neighboring device of the network device. When a link fault occurs in a network, an affected network device first performs local best path calculation. If determining, after the local best path calculation, that no local backup path to a destination route prefix exists, the network device sends a route withdraw message to the neighboring device. The neighboring device that receives the route withdraw message also performs local best path calculation, and sends a route withdraw message to another neighboring device when determining that no local backup path to the destination route prefix exists.

When a link fault occurs on the network, the network device on the fault transmission path needs to withdraw all affected BGP routes. As there are a large number of BGP routes in the network device, it is time-consuming for the network device to withdraw the routes, hindering route convergence of the network.

SUMMARY

This application provides a route processing method, a related apparatus, and a network system. When obtaining a first route whose route prefix includes an identifier of a route advertiser, a network device generates a first route entry, and when obtaining a second route related to the first route, the network device generates a second route entry based on the identifier of the route advertiser, so that the first route entry is associated with the second route entry. Because one first route entry may be associated with a plurality of second route entries, in a case in which there are a large number of service routes, the network device only needs to modify the first route entry based on a route withdraw message, thereby implementing route withdraw processing and effectively accelerating route convergence.

A first aspect of this application provides a packet processing method. A first network device obtains a first route, where a first route prefix of the first route includes an identifier of a route advertiser. The first route is a route advertised by another network device in a network system in which the first network device is located. The first network device generates a first route entry based on the first route, to implement reachability between the first network device and a route advertiser of the first route. The first network device obtains a second route, where the second route includes a second route prefix and the identifier of the route advertiser. The identifier of the route advertiser in the second route can indicate that the second route depends on the first route. The route advertiser of the second route is the same as the route advertiser of the first route, and the route advertiser of the second route may add an identifier of the second route (that is, an identifier of a route advertiser) to the second route when advertising the second route. The first network device generates a second route entry based on the identifier of the route advertiser and the second route prefix, to associate the first route entry with the second route entry, where the second route entry includes the second route prefix and the identifier of the route advertiser.

That is, after the first network device generates the second route entry associated with the first route entry, when the first network device receives a packet whose destination address is the second route prefix, the first network device can determine, based on the destination address of the packet, the second route entry and the first route entry associated with the second route entry, to determine path information about an outbound interface in the first route entry, thereby implementing packet forwarding.

In this application, when the first network device receives another route advertised by the route advertiser, the first network device can generate, based on the identifier of the route advertiser in the route, a plurality of route entries similar to the second route entry. That is, the plurality of route entries each include the identifier of the route advertiser and a route prefix corresponding to the route advertiser. The plurality of route entries generated by the first network device are all associated with the first route entry. Because the first route entry is associated with the plurality of route entries, and when a packet related to the plurality of route entries is forwarded, it is necessary to rely on the first route entry to search corresponding information about an outbound interface path. Therefore, when the first network device obtains a route withdraw message, the first network device only needs to modify the first route entry based on the route withdraw message, thereby implementing route withdraw processing and effectively accelerating route convergence.

Optionally, to facilitate the network device in the network to determine a type of the first route and a type of the second route, the first route further includes a first flag, and the first flag indicates that the first route is a basic route. The second route further includes a second flag, and the second flag indicates that the second route is a service route. Simply speaking, before the route advertiser advertises the first route or the second route, the first flag may be added to the first route or the second flag may be added to the second route, to indicate that the first route is a basic route or indicate that the second route is a service route. For example, in a case in which the first route and the second route are BGP routes, an attribute of the BGP message is extended based on the existing BGP, and a flag is added to the BGP route included in the BGP message, to indicate whether the BGP route is a basic route or a service route.

Optionally, the first network device generating a first route entry based on the first route includes: allocating, by the first network device, a basic next-hop index corresponding to the route advertiser, and generating, by the first network device, the first route entry based on the basic next-hop index, where the first route entry includes the identifier of the route advertiser and the basic next-hop index. In summary, after the first network device receives the basic route, the first network device allocates a corresponding basic next-hop index to the route advertiser based on the identifier of the route advertiser in the basic route. The basic next-hop index is in a one-to-one correspondence with the identifier of the route advertiser, and the identifier of each route advertiser has a unique corresponding basic next-hop index.

Optionally, when the first network device allocates the corresponding basic next-hop index to a route advertiser, the first route entry includes a first sub-route entry and a second sub-route entry, the first sub-route entry includes the identifier of the route advertiser and the basic next-hop index, the second sub-route entry includes the basic next-hop index and information about at least one outbound interface path, information about each outbound interface path includes an outbound interface and a next-hop address, and the next-hop address is an Internet protocol (IP) address of an interface of a neighboring device connected to the outbound interface.

The information about each outbound interface path in the second sub-route entry is obtained by the first network device based on the received basic route, and the information about each outbound interface path is corresponding to one basic route. For example, when receiving the first route, the first network device may obtain a next-hop address in the first route, and determine an outbound interface corresponding to the next-hop address in the first route by looking up a route table, to obtain information about an outbound interface path in the second sub-route entry. In addition, when the first network device receives another basic route whose route prefix is the same as the route prefix of the first route, the first network device may obtain a next-hop address and an outbound interface that are corresponding to the another basic route, to obtain information about another outbound interface path. The first network device may update the second sub-route entry based on the information about the another outbound interface path, so that the second sub-route entry includes information about a plurality of outbound interface paths.

In a case in which there are a large number of service routes, by allocating a basic next-hop index to an identifier of a route advertiser, and generating a route entry of a service route based on the basic next-hop index corresponding to the service route, resource overheads of the route entry can be effectively reduced, and storage resources of a network device can be saved.

Optionally, the second sub-route entry includes an index entry and a next-hop entry, the index entry includes the basic next-hop index and a direct next-hop index, and the next-hop entry includes the direct next-hop index and the information about the at least one outbound interface path. Simply speaking, the first network device may allocate a direct next-hop index to the information about the outbound interface path, and each direct next-hop index corresponds to information about at least one outbound interface path. When the first network device has a plurality of outbound interfaces, the direct next-hop index allocated by the first network device may be information corresponding to a plurality of outbound interface paths, or the direct next-hop index may be information corresponding to one or some of the outbound interface paths. For a plurality of different basic next-hop indexes, if outbound interface path information corresponding to the plurality of basic next-hop indexes is the same, direct next-hop indexes corresponding to the plurality of basic next-hop indexes are also the same.

In a case in which the number of basic next-hop indexes is large, by dividing the sub-route entry into an index entry and a direct next-hop entry, outbound interface and next-hop address information that need to be filled in the route table can be effectively reduced, thereby reducing resource overheads of the route table entry and saving storage resources of the network device.

Optionally, the first network device may further obtain a route withdraw message, where the route withdraw message includes an identifier of the route advertiser; and the first network device processes the second sub-route entry based on the route withdraw message. In the first route entry and the second route entry generated by the first network device, only the second sub-route entry of the first route entry includes information about an outbound interface path used to guide packet forwarding. Therefore, when the first network device obtains the route withdraw message, the first network device may process the second sub-route entry to withdraw an unreachable route.

Optionally, the first network device processing the second sub-route entry based on the route withdraw message includes the following: when the second sub-route entry includes information about an outbound interface path, it can be determined that there is only one path to the route advertiser indicated by the route withdraw message, and the first network device deletes the second sub-route entry. In addition, because there is only one path from the first network device to the route advertiser, after the path is withdrawn, the first network device cannot forward a packet destined for the route advertiser. Therefore, in addition to the second sub-route entry, the first network device may further delete the first sub-route entry and the second route table entry related to the route advertiser, that is, the first network device may further delete the first sub-route entry and the second route entry that include the identifier of the route advertiser in the route withdraw message.

When the second sub-route entry includes information about a plurality of outbound interface paths, the first network device deletes information about an outbound interface path corresponding to the route withdraw message from the second sub-route entry. Because the first network device records the next-hop address corresponding to each neighboring device, after the first network device determines the neighboring device that sends the route withdraw message to the first network device, the first network device may obtain the next-hop address corresponding to the neighboring device, and then determine a corresponding outbound interface based on the next-hop address, thereby obtaining the information about the outbound interface path corresponding to the route withdraw message. After obtaining the information about the outbound interface path corresponding to the route withdraw message, the first network device may delete the information about the outbound interface path corresponding to the route withdraw message from the second sub-route entry.

Optionally, the second route entry includes the second route prefix and the basic next-hop index.

Optionally, the identifier of the route advertiser is an IP address of a loopback interface of the route advertiser.

Optionally, the first network device obtaining a first route includes: receiving, by the first network device, an extended border gateway protocol message, where the extended border gateway protocol message includes the first route.

Optionally, the first route prefix is carried in a network layer reachability information (NLRI) field of the extended border gateway protocol message. In other words, in a process of advertising the first route, a route advertiser sends an extended BGP message to a neighboring device of the route advertiser, where the extended BGP message includes the first route, an NLRI field of the extended BGP message carries a first route prefix of the first route, and the first route prefix is an identifier of the route advertiser.

Optionally, the first network device sends a third route to the second network device, where a third route prefix of the third route is an identifier of the first network device; the first network device obtains a fourth route, where the fourth route includes a fourth route prefix; the first network device adds the identifier of the first network device to the fourth route to obtain a fifth route; and the first network device sends the fifth route to the second network device. That is, the first network device may serve as a route advertiser, and advertise a basic route whose route prefix is the identifier of the first network device. In addition, after the first network device imports the route from the outside, the first network device may add the identifier of the first network device to the imported route, and advertise the route after the identifier of the first network device is added, to implement advertisement of the service route.

A second aspect of this application provides a network device. The network device includes an obtaining unit and a processing unit. The obtaining unit is configured to obtain a first route, where a first route prefix of the first route includes an identifier of a route advertiser; and the processing unit is configured to generate a first route entry based on the first route; the obtaining unit is further configured to obtain a second route, where the second route includes a second route prefix and the identifier of the route advertiser; and the processing unit is configured to generate a second route entry based on the identifier of the route advertiser and the second route prefix, to associate the first route entry with the second route entry.

Optionally, the first route further includes a first flag, and the first flag indicates that the first route is a basic route; and the second route further includes a second flag, and the second flag indicates that the second route is a service route.

Optionally, the processing unit is further configured to allocate a basic next-hop index corresponding to the route advertiser, where the first route entry includes the identifier of the route advertiser and the basic next-hop index.

Optionally, the first route entry includes a first sub-route entry and a second sub-route entry, the first sub-route entry includes the identifier of the route advertiser and the basic next-hop index, the second sub-route entry includes the basic next-hop index and information about at least one outbound interface path, information about each outbound interface path includes an outbound interface and a next-hop address, and the next-hop address is an Internet protocol IP address of an interface of a neighboring device connected to the outbound interface.

Optionally, the second sub-route entry includes an index entry and a next-hop entry, the index entry includes the basic next-hop index and a direct next-hop index, and the next-hop entry includes the direct next-hop index and the information about the at least one outbound interface path.

Optionally, the obtaining unit is further configured to obtain a route withdraw message, where the route withdraw message includes an identifier of the route advertiser; and the processing unit is further configured to process the second sub-route entry based on the route withdraw message.

Optionally, the processing unit is further configured to: delete the second sub-route entry when the second sub-route entry includes information about an outbound interface path; and delete information about an outbound interface path corresponding to the route withdraw message from the second sub-route entry when the second sub-route entry includes information about a plurality of outbound interface paths.

Optionally, the second route entry includes the second route prefix and the basic next-hop index.

Optionally, the identifier of the route advertiser is an IP address of a loopback interface of the route advertiser.

Optionally, the network device further includes: a transceiver unit, configured to receive an extended border gateway protocol message, where the extended border gateway protocol message includes the first route.

Optionally, the first route prefix is carried in a network layer reachability information NLRI field of the extended border gateway protocol message.

Optionally, the network device further includes: a transceiver unit, configured to send a third route to the second network device, where a third route prefix of the third route is an identifier of the first network device; the obtaining unit is further configured to obtain a fourth route, where the fourth route includes a fourth route prefix; the processing unit is further configured to add an identifier of the first network device to the fourth route to obtain a fifth route; and the transceiver unit is further configured to send the fifth route to the second network device.

A third aspect of this application provides a network device, where the network device includes a processor, configured to enable the network device to implement the method described in any one of the first aspect or any possible implementation of the first aspect. The device may further include a memory. The memory is coupled to the processor. When the processor executes instructions stored in the memory, the network device may be enabled to implement the method according to any possible implementation of the first aspect. The device may further include a communication interface. The communication interface is used for the apparatus to communicate with another device. For example, the communication interface may be a transceiver, a circuit, a bus, a module, or a communication interface of another type.

The instructions in the memory in this application may be pre-stored, or may be stored after downloading from the Internet when the network device is used. Sources of the instructions in the memory are not specifically limited in this application. The coupling in this application is an indirect coupling or a connection between apparatuses, units, or modules, may be in an electrical form, a mechanical form, or another form, and is used for information exchange between the apparatuses, the units, or the modules.

A fourth aspect of this application provides a computer storage medium. The computer storage medium may be non-volatile. The computer storage medium stores a computer-readable instruction, and when the computer-readable instruction is executed by a processor, the method described in any one of the first aspect or any possible implementation of the first aspect is implemented.

A fifth aspect of this application provides a computer program product including an instruction. When the computer program product runs on a computer, the computer is enabled to perform the method described in any one of the first aspect or any possible implementation of the first aspect.

A sixth aspect of this application provides a network system, where the network system includes a plurality of network devices according to the second aspect or the third aspect.

The solutions provided in the second aspect to the sixth aspect are used to implement or cooperate to implement the method provided in the first aspect, and therefore, can achieve beneficial effects the same as or corresponding to those in the first aspect. Details are not described herein again.

BRIEF DESCRIPTION OF THE DRAWINGS

FIG. 2 is a schematic flowchart of a route processing method 200 according to an embodiment of this application;

FIG. 3a is a schematic diagram of a format of an attribute field of a BGP route according to an embodiment of this application;

FIG. 3b is a schematic diagram of a format of a subval field according to an embodiment of this application;

FIG. 3c is a schematic diagram of formats of a plurality of routes according to an embodiment of this application;

FIG. 4 is a schematic diagram of a route entry according to an embodiment of this application;

FIG. 5a is a schematic diagram of another route table according to an embodiment of this application;

FIG. 5b is a schematic diagram of another route table according to an embodiment of this application;

FIG. 6 is a schematic diagram of a comparison of route tables according to an embodiment of this application;

FIG. 7 is a schematic diagram of a network system according to an embodiment of this application;

FIG. 8 is a schematic diagram of a route entry according to an embodiment of this application;

FIG. 9 is a schematic diagram in which a leaf1 imports a route from the outside according to an embodiment of this application;

FIG. 10 is a schematic diagram of another route entry according to an embodiment of this application;

FIG. 11 is a schematic diagram of an updated route entry according to an embodiment of this application;

FIG. 14 is a schematic diagram of another route entry according to an embodiment of this application;

FIG. 15 is a schematic diagram of an updated route entry according to an embodiment of this application;

DETAILED DESCRIPTION OF ILLUSTRATIVE EMBODIMENTS

To make the objectives, technical solutions, and advantages of this application clearer and more comprehensible, the following describes embodiments of this application with reference to the accompanying drawings. It is clearly that described embodiments are merely some but not all of embodiments of this application. A person of ordinary skill in the art may learn that, as a new application scenario emerges, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the descriptions termed in such a manner are interchangeable in proper cases so that embodiments can be implemented in another order than the order illustrated or described in this application. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. Names or numbers of steps in this application do not mean that the steps in the method procedure need to be performed in a time/logical sequence indicated by the names or numbers. An execution order of the steps in the procedure that have been named or numbered can be changed based on a technical objective to be achieved, provided that same or similar technical effects can be achieved. Unit division in this application is logical division and may be other division during actual implementation. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms. This is not limited in this application. In addition, units or subunits described as separate parts may or may not be physically separate, may or may not be physical units, or may be distributed into a plurality of circuit units. Some or all of the units may be selected according to actual requirements to achieve the objectives of the solutions of this application.

Figure 1:
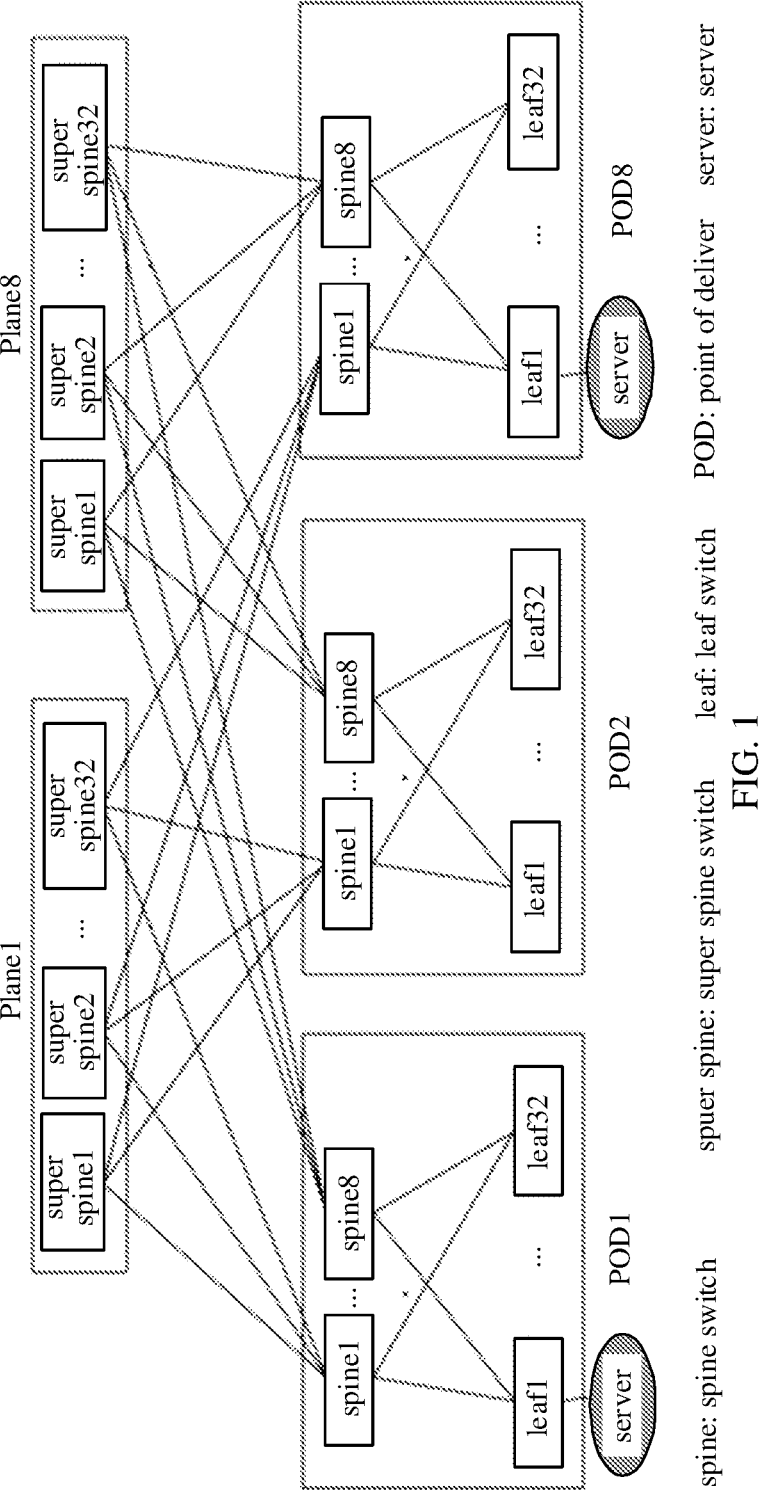
FIG. 1 is a schematic diagram of a network architecture according to an embodiment of this application.

Currently, in a large-scale data center, to implement non-blocking traffic forwarding, a CLOS network architecture is usually used for networking. The CLOS network architecture is a multi-level switching network architecture. The topology of the multi-level switching network architecture does not exceed three tiers or 5 stages. The entire data center uses three-tier networking, that is, each network device in an entire network runs a route protocol, and an equal-cost multi-path (ECMP) link is formed between network devices through a three-tier route protocol. ECMP is a load balancing mechanism for the CLOS network architecture. A network device can implement traffic load balancing using all network devices that are directly connected to the network device. In other words, load balancing of data packets may be implemented between different ECMP links, so that link bandwidth in the CLOS network architecture is fully utilized. For a large data center, the route protocol used is the direct hop-by-hop border gateway protocol (BGP). That is, the direct hop-by-hop BGP runs between the network devices in the data center. When a BGP route is propagated between network devices, the network devices change a next-hop of the BGP route hop by hop. Specifically, refer to FIG. 1. FIG. 1 is a schematic diagram of a network architecture according to an embodiment of this application. The network architecture is divided into three tiers. A leaf switch at the bottom tier is connected to a server, the leaf switch is further connected to a spine switch at a middle tier, and the spine switch is connected to a super spine switch at a core tier. BGP can be run on each interconnection link between network devices of different tiers. To facilitate management, devices in the data center are planned and managed in the form of points of deliver (POD). Each POD includes a plurality of leaf switches (32 leaf switches are shown in FIG. 1) and a plurality of spine switches (8 spine switches are shown in FIG. 1). Each POD communicates with other PODs through the super spine switch.

BGP is a distance-vector (DV) protocol. A network device running BGP advertises only a calculated best path to a neighboring device of the network device. When a link fault occurs in a network, an affected network device first performs best path calculation. If determining, after the best path calculation, that no backup path to a destination route prefix exists in the network device, the network device sends a route withdraw message to the neighboring device. The neighboring device that receives the route withdraw message also performs best path calculation, and sends a route withdraw message to another neighboring device when determining that no backup path to the destination route prefix exists. In some extreme cases, the route withdraw message may even need to be transmitted to all network devices in the entire network.

In a large data center with a complex network topology, each network device may store a large number of BGP routes. When a link fault occurs on the network, the network device on the fault transmission path needs to withdraw all affected BGP routes. As there are a large number of BGP routes exist in the network device, it is time-consuming for the network device to withdraw the routes, hindering route convergence of the network.

In view of this, embodiments of this application provide a route processing method. When obtaining a first route whose route prefix includes an identifier of a route advertiser, a network device generates a first route entry, and when obtaining a second route related to the first route, the network device generates a second route entry based on the identifier of the route advertiser, so that the first route entry is associated with the second route entry. Because one first route entry may be associated with a plurality of second route entries, in a case in which there are a large number of service routes, the network device only needs to modify the first route entry based on a route withdraw message, thereby implementing route withdraw processing and effectively accelerating route convergence.

Refer to FIG. 2. FIG. 2 is a schematic flowchart of a route processing method 200 according to an embodiment of this application. As shown in FIG. 2, the route processing method 200 provided in this embodiment of this application includes steps 201 to 204.

Step 201: A first network device obtains a first route, where a first route prefix of the first route includes an identifier of a route advertiser.

In this embodiment, the first network device may be, for example, a physical device such as a router, a switch, or a gateway, or may be a virtual device that supports packet forwarding. For example, the first network device may be the foregoing leaf switch, spine switch, or super spine switch. This embodiment does not limit the first network device.

The first route is a route advertised by another network device in a network system in which the first network device is located, and the first network device may obtain the first route in multiple manners.

In a possible implementation, each network device in the network may serve as a route advertiser, and advertise, through BGP, a route whose route prefix includes the identifier of the route advertiser. In addition, after receiving a route, each network device in the network modifies a next-hop address of the received route, and sends the modified route to a neighboring device of the network device, thereby implementing network-wide propagation of the route. That is to say, the first network device can receive, from the neighboring device, routes advertised by route advertisers in the network.

For example, the first network device receives the first route sent by the neighboring device of the first network device, where a first route prefix of the first route includes an identifier of a route advertiser, and a next-hop address of the first route is an interface IP address of the neighboring device, that is, an IP address of an interface connected between the neighboring device and the first network device. Based on the next-hop address of the first route, the first network device can determine, by looking up a route table, an outbound interface corresponding to the first route. The outbound interface corresponding to the first route is an interface connected between the first network device and the neighboring device. The identifier of the route advertiser may be a unique identifier of the route advertiser in the network, and can uniquely identify the route advertiser. For example, the identifier of the route advertiser is an IP address of a loopback interface of the route advertiser.

Optionally, the route advertiser may advertise the first route by extending a BGP message. For example, in a process of advertising the first route, the route advertiser sends an extended BGP message to a neighboring device of the route advertiser, where the extended BGP message includes the first route, an NLRI field of the extended BGP message carries a first route prefix of the first route, and the first route prefix is the identifier of the route advertiser. That is, a manner in which the first network device obtains the first route may include: The first network device receives an extended BGP message, where the extended BGP message includes the first route, and the first route prefix is carried in a network layer reachability information NLRI field of the extended BGP message.

In another possible implementation, each network device in the network may advertise node information of the network device and link information between the network device and a neighboring device through a route, so that the node information and the link information can be propagated on the entire network. In this case, each network device in the network can receive the routes advertised by other network devices to obtain the node information and the link information related to each network device in the network, thereby implementing synchronization of the node information and the link information on the entire network. In this way, each network device in the network may obtain a network-wide topology based on the obtained node information and link information, so as to calculate path reachability between the network devices based on a path computation algorithm (for example, a shortest path algorithm).

Optionally, the route advertiser may advertise the first route through a border gateway protocol-shortest path first (BGP SPF) message. The route advertiser may obtain node information of the route advertiser and link information between the route advertiser and a peer neighboring device, and send a BGP SPF message to the neighboring device, where the BGP SPF message includes a first route, and the first route includes the node information of the route advertiser and the link information between the route advertiser and the neighboring device.

For example, the first network device receives the first route sent by the neighboring device of the first network device, where the first route includes the node information of the route advertiser and the link information between the route advertiser and the neighboring device of the route advertiser. The node information of the route advertiser may include an identifier of the route advertiser (for example, a loopback address of the route advertiser), the link information between the route advertiser and the neighboring device of the route advertiser (including an IP address of an interface connected to the neighboring device on the route advertiser, that is, a local interface address of the route advertiser), and an IP address of an interface connected to the route advertiser on the neighboring device (that is, an interface address of a peer end of the route advertiser).

Step 202: The first network device generates a first route entry based on the first route.

Because the first route may be a route advertised by any network device in the network except the first network device, the first network device may generate the first route entry based on the first route, so as to implement reachability between the first network device and a route advertiser of the first route.

In a possible embodiment, in a case in which the first route is advertised through BGP, when a route advertised by a route advertiser is propagated between network devices, the network device changes a next-hop address of the route hop by hop. The next-hop address in the first route received by the first network device from the neighboring network device is an interface IP address of the neighboring device, that is, an IP address of an interface connected between the neighboring device and the first network device. Based on the next-hop address of the first route, the first network device can determine, by looking up a route table, an outbound interface corresponding to the first route. Based on the first route prefix of the first route, the next-hop address of the first route, and the outbound interface corresponding to the first route, the first network device generates a first route entry, where the first route entry includes the first route prefix, the next-hop address of the first route, and the outbound interface corresponding to the first route. In this way, when the first network device needs to forward a packet whose destination address is the first route prefix, the first network device may forward the packet by querying the first route entry, that is, forward the packet based on the outbound interface in the first route entry.

In another possible embodiment, in a case in which the first route includes the node information of the route advertiser and the link information between the route advertiser and the neighboring device of the route advertiser, the first network device may receive a route that includes the node information and the link information and that is advertised by other network devices in the network. Based on the received route, the first network device may obtain node information of network devices in the entire network and corresponding link information, thereby obtaining a topology of the entire network. Then, the first network device calculates, based on a path computation algorithm, reachability of a path between the first network device and another network device in the network, so as to obtain a next-hop address and an outbound interface that are from the first network device to each of the other network devices. In this way, the first network device may generate the first route entry based on the node information (that is, the identifier of the route advertiser) in the first route, and the calculated next-hop address and outbound interface that are to the route advertiser.

Optionally, to facilitate the network device in the network to determine a type of the first route, the first route further includes a first flag, and the first flag indicates that the first route is a basic route. Simply speaking, before the route advertiser advertises the first route, the first flag may be added to the first route, to indicate that the first route is a basic route. The basic route refers to a route whose route prefix includes an identifier of a route advertiser. Any network device in the network can function as a route advertiser to advertise basic routes. For the first network device, when the first network device obtains the first route including the first flag, the first network device may determine, based on the first flag in the first route, that the first route is a basic route, to generate the first route entry based on the first route.

Step 203: The first network device obtains a second route, where the second route includes a second route prefix and the identifier of the route advertiser.

In this embodiment, the route advertiser of the second route is the same as the route advertiser of the first route, and the route advertiser of the second route may add an identifier of the second route (that is, an identifier of the route advertiser) to the second route when advertising the second route.

Specifically, the route advertiser of the second route may import a route from the outside, and add an identifier of the second route to the imported route, to obtain the second route. Then, the route advertiser advertises the second route again in the network, so that the route imported by the route advertiser includes the identifier of the route advertiser. When the route advertiser of the second route imports a route from the outside, the route prefix of the imported route is not modified, that is, the second route prefix in the second route does not change before and after the second route is imported.

Optionally, the route advertiser importing a route from the outside may refer to that the route advertiser imports a route from another protocol and advertises the route in the BGP network. For example, the route advertiser imports a route from the open shortest path first (OSPF) protocol. The import of a route by a route advertiser from the outside can also refer to the import of a static route or a direct route by a route advertiser. The static route refers to a route manually configured by the network administrator. That is, the network administrator configures a static route on the route advertiser through commands or operations to realize the route import of the route advertiser. A direct route is usually discovered by a link-layer protocol, which refers to the path information to the network segment where the interface address of a network device resides. The path information does not need to be maintained by the network administrator or calculated by the network device using a certain algorithm. As long as the interface on the network device is in the active state, the network device can obtain the route information to the network segment. For example, it is assumed that the route advertiser of the second route is a leaf switch connected to a server. The leaf switch imports a direct route by obtaining path information about a network segment in which an interface connected to the server on the leaf switch is located, and a route prefix of a route imported by the leaf switch is an address of the network segment in which the interface is located.

Step 204: The first network device generates a second route entry based on the identifier of the route advertiser and the second route prefix, to associate the first route entry with the second route entry.

The route prefix of the first route advertised by the route advertiser is an identifier of the route advertiser, and when advertising the second route, the route advertiser adds the identifier of the route advertiser to the second route. Therefore, the first network device can determine, based on the identifier of the route advertiser in the second route, that the second route depends on the first route. In this way, the first network device may generate the second route entry based on the identifier of the route advertiser and the second route prefix, where the second route entry includes the second route prefix and the identifier of the route advertiser. Because the first route entry includes a same identifier of a route advertiser, the first route entry and the second route entry can be associated. The first network device can forward, based on the associated first route entry and the associated second route entry, a packet whose destination address corresponds to the second route prefix. A specific association manner may be that the first route entry and the second route entry are stored in a same route table, or a corresponding basic next-hop index is allocated to the identifier of the route advertiser, and the first route entry and the second route entry are associated through the basic next-hop index.

That is, after the first network device generates the second route entry associated with the first route entry, when the first network device receives a packet whose destination address corresponding to the second route prefix, the first network device can determine, based on the destination address of the packet, the second route entry and the first route entry associated with the second route entry, to determine path information about an outbound interface in the first route entry, thereby forwarding the packet.

It may be understood that, for the route advertiser of the second route, in addition to the second route, a large number of other routes may be imported. When importing other routes, the route advertiser also adds the identifier of the route advertiser (that is, the identifier of the route advertiser) to the imported routes. In this way, when the first network device receives another route advertised by the route advertiser, the first network device can generate, based on the identifier of the route advertiser in the route, a plurality of route entries similar to the second route entry. That is, the plurality of route entries each include the identifier of the route advertiser and a route prefix corresponding to the route advertiser. The plurality of route entries generated by the first network device are all associated with the first route entry. When forwarding a packet corresponding to a route prefix in the plurality of route entries, the first network device may forward the packet based on the plurality of route entries and the first route entry.

Because the first route entry is associated with the plurality of route entries, and when a packet related to the plurality of route entries is forwarded, it is necessary to rely on the first route entry to search corresponding information about an outbound interface path. Therefore, when obtaining the route withdraw message, the first network device only needs to modify the first route entry based on the route withdraw message, thereby implementing route withdraw processing and effectively improving the route convergence speed.

Optionally, to facilitate the network device in the network to determine a type of the second route, the second route further includes a second flag, and the second flag indicates that the second route is a service route. Simply speaking, before the route advertiser advertises the second route, the second flag may be added to the second route, to indicate that the second route is a service route. The service route is a route used to guide service packet forwarding. In addition, the service route includes an identifier of a route publisher, to indicate a basic route on which the service route depends.

Any network device in the network can function as a route advertiser to advertise service routes. When the first network device obtains the second route including the second flag, the first network device may determine, based on the second flag in the second route, that the second route is a service route, to generate the second route entry based on the second route prefix and the identifier of the route advertiser in the second route.

For ease of understanding, the following describes in detail implementations of adding the first flag to the first route and adding the second flag to the second route.

In a case in which the first route and the second route are BGP routes, an attribute of the BGP message is extended based on the existing BGP, and a flag is added to the BGP route included in the BGP message, to indicate whether the BGP route is a basic route or a service route. For example, refer to FIG. 3a. FIG. 3a is a schematic diagram of a format of an attribute field of a BGP route according to an embodiment of this application. As shown in FIG. 3a, an additional attribute (attribute) field of a BGP route is extended, to indicate whether the BGP route is a basic route or a service route. In FIG. 3a, AttrFlag represents a flag of an attribute, to indicate that the field is an attribute field; type represents a type of the attribute, where a value of type may be specifically 255, and is used to indicate that the route attribute is an optional transfer attribute; len represents a length of subsequent content of the attribute field; Feature Code Point represents a feature code; Version Number represents a version number; Length represents a length of subsequent content; and subval (sub-variable) represents a sub-variable, the subval includes a flag indicating whether a route is a basic route or a service route.

Refer to FIG. 3b. FIG. 3b is a schematic diagram of a format of a subval field according to an embodiment of this application. In FIG. 3b, sub-type represents a sub-type, and a value of the sub-type is fixed to 1; len indicates a length of subsequent content of the subval field; Flag is a flag bit; mask represents a mask length of 0 to 128; and Prefix indicates a prefix of a basic route on which a service route depends when the current route is a service route. Optionally, the Flag may include at least two bits: an S bit and a T bit. The S bit indicates a protocol stack type. When the S bit is not set (that is, a value of the S bit is 0), it indicates that the current route is an Internet protocol version 4 (IPv4) route; or when the S bit is set (that is, a value of the S bit is 1), it indicates that the current route is an Internet protocol version 6 (IPv6) route. The T bit indicates the attribute type. When the T bit is not set (that is, a value of the T bit is 0), it indicates that the current route is a basic route. When the T bit is set (that is, a value of the T bit is 1), it indicates that the current route is a service route.

Refer to FIG. 3c. FIG. 3c is a schematic diagram of formats of a plurality of routes according to an embodiment of this application. The first two bits in the flag are respectively an S bit and a T bit. In (a) in FIG. 3c, the first two bits of the flag are 00, indicating a format of an IPv4 basic route. In (b) in FIG. 3c, the first two bits of the flag are 10, indicating a format of an IPv6 basic route. In (c) in FIG. 3c, the first two bits of the flag are 01, indicating a format of an IPv4 service route, and a mask length of a basic route on which the IPv4 service route depends is 32. In (d) in FIG. 3c, the first two bits of the flag are 11, indicating a format of an IPv6 service route, and a mask length of a basic route on which the IPv6 service route depends is 128. In addition, IPv4 basic routes can also be non-32-bit host routes, for example, IPv4 basic routes are routes with a mask length of 24. IPv6 basic routes can also be non-128-bit host routes, for example, IPv6 basic routes are routes with a mask length of 64.

The foregoing describes an implementation of adding the first flag to the first route and adding the second flag to the second route. The following describes in detail a process in which the first network device generates the first route entry and the second route entry.

In a possible embodiment, the first network device generating a first route entry based on the first route specifically includes the following: the first network device allocates a basic next-hop index corresponding to the route advertiser, and generates the first route entry based on the basic next-hop index, where the first route entry includes the identifier of the route advertiser and the basic next-hop index. In summary, after the first network device receives the basic route, the first network device allocates a corresponding basic next-hop index to the route advertiser based on the identifier of the route advertiser in the basic route. The basic next-hop index is in a one-to-one correspondence with the identifier of the route advertiser, and the identifier of each route advertiser has a unique corresponding basic next-hop index.

Optionally, when the first network device allocates the corresponding basic next-hop index to a route advertiser, the first route entry includes a first sub-route entry and a second sub-route entry, the first sub-route entry includes the identifier of the route advertiser and the basic next-hop index, the second sub-route entry includes the basic next-hop index and information about at least one outbound interface path, information about each outbound interface path includes an outbound interface and a next-hop address, and the next-hop address is an IP address of an interface of a neighboring device connected to the outbound interface.

The information about each outbound interface path in the second sub-route entry is obtained by the first network device based on the received basic route, and the information about each outbound interface path is corresponding to one basic route. For example, when receiving the first route, the first network device may obtain a next-hop address in the first route, and determine an outbound interface corresponding to the next-hop address in the first route by looking up a route table, to obtain information about an outbound interface path in the second sub-route entry. In addition, when the first network device receives another basic route whose route prefix is the same as the route prefix of the first route, the first network device may obtain a next-hop address and an outbound interface that are corresponding to the another basic route, to obtain information about another outbound interface path. The first network device may update the second sub-route entry based on the information about the another outbound interface path, so that the second sub-route entry includes information about a plurality of outbound interface paths.

For example, it is assumed that a route prefix of the first route received by the first network device is 1.1.1.1/32, a next-hop address in the first route is 192.168.5.1, and an outbound interface obtained by the first network device by looking up a route table based on the next-hop address is an interface 1. In addition, the basic next-hop index allocated by the first network device to the route advertiser of the first route is Index 1. In this case, the first route entry generated by the first network device based on the first route includes a first sub-route entry and a second sub-route entry, the first sub-route entry includes a route prefix 1.1.1.1/32 and a basic next-hop index Index 1, and the second sub-route entry includes a basic next-hop index Index 1, an interface 1, and a next-hop address 192.168.5.1. Specifically, refer to FIG. 4. FIG. 4 is a schematic diagram of a route entry according to an embodiment of this application. As shown in FIG. 4, Table 1 in FIG. 4 is corresponding to the first sub-route entry, and Table 2 in FIG. 4 is corresponding to the second sub-route entry.

Optionally, when the first network device allocates a corresponding basic next-hop index to the route advertiser, the second route entry includes the second route prefix and the basic next-hop index. Because the first route entry includes a same basic next-hop index, association between the first route entry and the second route entry may be implemented based on the basic next-hop index.

It may be understood that for the first network device, a first network device may receive a large number of service routes, that is, the second route is only one of the service routes received by the first network device. In this case, in a case in which the first network device does not allocate a basic next-hop index to the route advertiser, when the first network device generates a route entry based on the received service route, a route entry corresponding to each service route includes a route prefix of the service route and an identifier of a route advertiser corresponding to the service route. Because there are a large number of service routes, there are also a large number of route entries generated by the first network device based on the service routes. In addition, compared with the basic next-hop index, a bit corresponding to the identifier of the route advertiser is much higher than a bit corresponding to the basic next-hop index. Generally, there are dozens of bits corresponding to the identifier of the route advertiser, but there are only several bits corresponding to the basic next-hop index.

In this way, in a case in which there are a large number of service routes, by allocating a basic next-hop index to an identifier of a route advertiser, and generating a route entry of a service route based on the basic next-hop index corresponding to the service route, resource overheads of the route entry can be effectively reduced, and storage resources of a network device can be saved.

In practical applications, the second route entry generated by the first network device and the first sub-route entry in the first route entry may be in a same route table, or the second route entry and the first route entry may be in different route tables.

Refer to FIG. 5a. FIG. 5a is a schematic diagram of another route table according to an embodiment of this application. As shown in FIG. 5a, the second route entry generated by the first network device is in Table 1, that is, the second route entry generated by the first network device and the first sub-route entry in the first route entry are in the same route table.

Refer to FIG. 5b. FIG. 5b is a schematic diagram of another route table according to an embodiment of this application. As shown in FIG. 5b, the second route entry generated by the first network device corresponds to Table 3 in FIG. 5b. The second route entry and the first route entry are located in different route tables. Simply speaking, a route entry corresponding to a service route is in a route table, and a route entry corresponding to a basic route is in another route table.

Optionally, the second sub-route entry may further include an index entry and a next-hop entry, the index entry includes the basic next-hop index and a direct next-hop index, and the next-hop entry includes the direct next-hop index and the information about the at least one outbound interface path. Simply speaking, the first network device may allocate a direct next-hop index to the information about the outbound interface path, and each direct next-hop index corresponds to information about at least one outbound interface path. When the first network device has a plurality of outbound interfaces, the direct next-hop index allocated by the first network device may be information corresponding to a plurality of outbound interface paths, or the direct next-hop index may be information corresponding to one or some of the outbound interface paths. For a plurality of different basic next-hop indexes, if outbound interface path information corresponding to the plurality of basic next-hop indexes is the same, direct next-hop indexes corresponding to the plurality of basic next-hop indexes are also the same.

It may be understood that because the basic next-hop index is in a one-to-one correspondence with the identifier of the route advertiser, when there are a large number of network devices in the network, there are also a relatively large number of basic next-hop indexes allocated by the first network device. Information about an outbound interface path on the first network device is related to an outbound interface on the first network device. A quantity of outbound interfaces on the first network device is usually less than a quantity of network devices in the network. Therefore, different basic next-hop indexes may correspond to same information about outbound interface path. In addition, because the bit corresponding to the information about the outbound interface path is much higher than the bit corresponding to the direct next-hop index, the second sub-route entry is divided into an index entry and a next-hop entry, and the direct next-hop index is associated with the basic next-hop index, so that resource overheads of the route entry can be further reduced, and storage resources of the network device can be saved.

For example, refer to FIG. 6. FIG. 6 is a schematic comparison diagram of a route table according to an embodiment of this application. As shown in FIG. 6, Table 2 represents a route table composed of a plurality of sub-route entries. Table 2 includes a plurality of basic next-hop indexes and an outbound interface and a next-hop address corresponding to each basic next-hop index. After each sub-route entry is divided into an index entry and a next-hop entry, an index table composed of a plurality of index entries and a next-hop table composed of a plurality of next-hop entries may be obtained. The index table includes a plurality of index entries, and each index entry includes a basic next-hop index and a direct next-hop index. The next-hop table includes a plurality of next-hop entries, and each next-hop entry includes a direct next-hop index, an outbound interface corresponding to the direct next-hop index, and a next-hop address. It can be learned from FIG. 6 that, in Table 2, each basic next-hop index has a corresponding outbound interface and a next-hop address, and the number of outbound interfaces and next-hop addresses that need to be filled in the route table is related to the number of basic next-hop indexes. When there are many basic next-hop indexes, more outbound interfaces and next-hop addresses need to be filled in the route table. However, in the index table and the next-hop table, each basic next-hop index has a corresponding direct next-hop index, and different direct next-hop indexes correspond to different outbound interfaces and next-hop addresses. Generally, the number of bits corresponding to the outbound interface and the next-hop address is more than dozens, but the number of bits corresponding to the direct next-hop index is only a few. That is, the number of bits corresponding to the outbound interface and the next-hop address is much higher than the number of bits corresponding to the direct next-hop index.

Therefore, in a case in which the number of basic next-hop indexes is large, by dividing the sub-route entry into an index entry and a direct next-hop entry, outbound interface and next-hop address information that need to be filled in the route table can be effectively reduced, thereby reducing resource overheads of the route table entry and saving storage resources of the network device.

The foregoing describes a process of generating the first route entry and the second route entry by the first network device, and the following describes a process of performing route convergence by the first network device based on the route withdraw message.

In a possible embodiment, the method 200 further includes the following: the first network device obtains a route withdraw message, where the route withdraw message includes an identifier of the route advertiser; and the first network device processes the second sub-route entry based on the route withdraw message. In the first route entry and the second route entry generated by the first network device, only the second sub-route entry of the first route entry includes information about an outbound interface path used to guide packet forwarding. Therefore, when the first network device obtains the route withdraw message, the first network device may process the second sub-route entry to withdraw an unreachable route.

Specifically, the first network device processing the second sub-route entry based on the route withdraw message includes two cases.

Case 1: When the second sub-route entry includes information about an outbound interface path, the first network device deletes the second sub-route entry.

If the second sub-route entry includes only information about an outbound interface path, it may be determined that there is only one path to the route advertiser indicated by the route withdraw message, and the first network device may delete the second sub-route entry to withdraw the path to the route advertiser. In addition, because there is only one path from the first network device to the route advertiser, after the path is withdrawn, the first network device cannot forward a packet destined for the route advertiser. Therefore, in addition to the second sub-route entry, the first network device may further delete the first sub-route entry and the second route table entry related to the route advertiser, that is, the first network device may further delete the first sub-route entry and the second route entry that include the identifier of the route advertiser in the route withdraw message.

In addition, in a case in which the second sub-route entry includes only information about an outbound interface path, after the first network device deletes the second sub-route entry, the first network device may further forward the route withdraw message to a neighboring device of the first network device, to instruct the neighboring device to execute route withdraw processing. Because there is only one path from the first network device to the route advertiser, after the path is withdrawn, the first network device cannot forward the packet destined for the route advertiser, and therefore the first network device needs to forward the route withdraw message to the neighboring device of the first network device.

Case 2: When the second sub-route entry includes information about a plurality of outbound interface paths, the first network device deletes information about an outbound interface path corresponding to the route withdraw message from the second sub-route entry.

If the second sub-route entry includes information about a plurality of outbound interface paths, it may be determined that there are a plurality of paths to the route advertiser indicated by the route withdraw message, and the first network device may delete only one path corresponding to the route withdraw message. Specifically, when the first network device receives the route withdraw message from the neighboring device, the first network device may determine, based on the interface for receiving the route withdraw message, the neighboring device that sends the route withdraw message to the first network device. Because the first network device records the next-hop address corresponding to each neighboring device, after the first network device determines the neighboring device that sends the route withdraw message to the first network device, the first network device may obtain the next-hop address corresponding to the neighboring device, and then determine a corresponding outbound interface based on the next-hop address, thereby obtaining the information about the outbound interface path corresponding to the route withdraw message. After obtaining the information about the outbound interface path corresponding to the route withdraw message, the first network device may delete the information about the outbound interface path corresponding to the route withdraw message from the second sub-route entry.

In a case in which the second sub-route entry includes information about a plurality of outbound interface paths, after the first network device deletes the information about the outbound interface path corresponding to the route withdraw message from the second sub-route entry, the second sub-route entry further includes information about other outbound interface paths, that is, the first network device may further continue to forward a packet to a route advertiser. Therefore, the first network device does not need to forward the route withdraw message to a neighboring device of the first network device.

Optionally, the first network device may obtain the route withdraw message in a plurality of manners. For example, when the first network device is a peer device of a failed link or a peer device of a failed node, the first network device senses a link failure or a peer device failure by detecting a state of the link or an interface state corresponding to the link, to generate a route withdraw message. When the first network device is not the peer device of the failed link and the first network device is not the peer device of the failed node, the first network device may receive the route withdraw message sent by the neighboring device.

It may be understood that the foregoing describes a process in which the first network device receives a route advertised by another network device in the network and generates a route entry. In practical applications, the first network device may also serve as a route advertiser to advertise a basic route and a service route.

For example, the first network device sends a third route to the second network device, and a third route prefix in the third route is an identifier of the first network device. The second network device is a neighboring device of the first network device, and the third route may further include a first flag, to indicate that the third route is a basic route. The first network device obtains a fourth route, where the fourth route includes a fourth route prefix, and the fourth route may be a route imported by the first network device from the outside. The first network device adds an identifier of the first network device to the fourth route to obtain a fifth route. The first network device sends the fifth route to the second network device. In addition, the first network device may further add a second flag to the fourth route, that is, the fifth route further includes the second flag, and the second flag indicates that the fifth route is a service route.

That is, the first network device may serve as a route advertiser, and advertise a basic route whose route prefix is the identifier of the first network device. In addition, after the first network device imports the route from the outside, the first network device may add the identifier of the first network device to the imported route, and advertise the route after the identifier of the first network device is added, to advertise the service route.

To facilitate understanding of the route processing method provided in embodiments of this application, the following describes in detail a process in which a network device in a network processes basic route and service route with reference to a specific example.

Refer to FIG. 7. FIG. 7 is a schematic diagram of a network system according to an embodiment of this application. As shown in FIG. 7, the network system includes a leaf1, a spine1, a super spine1, a spine3, a spine2, a super spine2, a spine4 and a leaf2. Each network device in the network system may advertise a basic route whose route prefix is an identifier of the network device. The leaf1 is used as an example. It is assumed that an identifier of the leaf1 is 1.1.1.1/32, the leaf1 sends, to the spine1 and the spine2 respectively, a basic route whose route prefix is 1.1.1.1/32, and the basic route sent by the leaf1 may further include the first flag. In this way, a basic route sent by the leaf1 to the spine1 sequentially passes through the spine1, the super spine1, and the spine3, and reaches the leaf2. A basic route sent by the leaf1 to the spine2 sequentially passes through the spine2, the super spine2, and the spine4, and reaches the leaf2. In other words, the leaf2 may receive, from the spine3 and the spine4 respectively, basic routes whose route prefixes are both 1.1.1.1/32.

It is assumed that an address of an interface that connects the spine3 to the leaf2 is 192.168.3.1, and a next-hop address of a basic route forwarded by the spine3 to the leaf2 is 192.168.3.1. It is assumed that an interface that connects the leaf2 to the spine3 is an interface 1, and the leaf2 searches a route table based on the next-hop address 192.168.3.1, and obtains that a corresponding outbound interface is the interface 1.

Similarly, it is assumed that an address of an interface that connects the spine4 to the leaf2 is 192.168.4.1, and a next-hop address of a basic route forwarded by the spine4 to the leaf2 is 192.168.4.1. It is assumed that an interface that connects the leaf2 to the spine4 is an interface 2, and leaf2 searches a route table based on the next-hop address 192.168.4.1, and obtains that a corresponding outbound interface is the interface 2.

In this way, based on the basic routes received from the spine3 and the spine4, the leaf2 may generate a corresponding route entry. Specifically, refer to FIG. 8. FIG. 8 is a schematic diagram of a route entry according to an embodiment of this application. As shown in FIG. 8, the route entry generated by the leaf2 includes a first sub-route entry, an index entry, and a direct next-hop entry. As shown in Table 4 in FIG. 8, the first sub-route entry includes a route prefix 1.1.1432 and a basic next-hop index Index 1. As shown in Table 5 in FIG. 8, the index entry includes a basic next-hop index Index 1 and a direct next-hop index 1. As shown in Table 6 in FIG. 8, the direct next-hop entry includes a direct next-hop index 1 and information about two outbound interface paths. The information about the two outbound interface paths respectively includes that an outbound interface is an interface 1 and a next-hop address is 192.168.3.1, and that an outbound interface is an interface 2 and a next-hop address is 192.168.4.1.

After leaf1 advertises the basic route, leaf1 imports a plurality of routes from the outside. For example, in practical applications, leaf1 may import tens of thousands of routes from the outside. Specifically, refer to FIG. 9. FIG. 9 is a schematic diagram in which a leaf1 imports a route from the outside according to an embodiment of this application. The following uses the two routes imported by leaf1 as an example. The route prefixes of the two routes are 10.1.1.0/24 and 11.1.1.0/24. Leaf1 adds an identifier of a leaf1 (that is, 1.1.1.1/32) to each of the two imported routes, to obtain two service routes with route prefixes 10.1.1.0/24 and 11.1.1.0/24 respectively. Leaf1 may further add a second flag to the two service routes, to indicate that the two service routes are service routes. Then, the leaf1 sends the two service routes to the spine1 and the spine2 respectively. In this way, two service routes sent by leaf1 to spine1 sequentially pass through the spine1, the super spine1, and the spine3, and reach the leaf2. Two service routes sent by the leaf1 to the spine2 sequentially pass through the spine2, the super spine2, and the spine4, and reach the leaf2. In other words, leaf2 may respectively receive, from the spine3 and the spine4 respectively, service routes whose route prefixes are both 10.1.1.0/24 and 11.1.1.0/24.

Because the service route received by the leaf2 includes the identifier of the leaf1, and the identifier of the leaf1 has a corresponding basic next-hop index, the leaf2 may generate the second route entry based on the route prefix of the received service route and the basic next-hop index corresponding to the identifier of the leaf1. The second route entry includes a route prefix of the service route and a basic next-hop index corresponding to the identifier of the leaf1. Specifically, refer to FIG. 10. FIG. 10 is a schematic diagram of another route entry according to an embodiment of this application. As shown in FIG. 10, the second route entry generated by the leaf2 is in Table 4. In Table 4, both route prefixes 10.1.1.0/24 and 11.1.1.0/24 of the service route are associated with the basic next-hop index Index 1. In this way, when the leaf2 receives a packet whose destination address is 10.1.1.0/24 or 11.1.1.0/24, the leaf2 may obtain an outbound interface and a next-hop address of the packet by searching Table 4, Table 5, and Table 6, to forward the packet.

The foregoing describes a process in which the leaf2 generates a route entry, and the following describes a process in which the leaf2 processes the route entry after obtaining the route withdraw message.

It is assumed that a link between the leaf1 and the spine1 is faulty. After spine1 senses the link fault, the spine1 sends a route withdraw message to the super spine1, where the route withdraw message includes an identifier (that is, 1.1.1.1/32) of the leaf1. After the route withdraw message is transferred to the spine3 through the super spine1, the spine3 transfers the route withdraw message to the leaf2. After receiving the route withdraw message, the leaf2 determines that the neighboring device that transfers the route withdraw message is the spine3 based on the interface for receiving the route withdraw message. The leaf2 searches for a next-hop address of the spine3 and an outbound interface corresponding to the spine3, to obtain to-be-deleted path information about the outbound interface. Based on the to-be-deleted path information about the outbound interface, the leaf2 deletes the next-hop address (192.168.3.1) of the spine3 and the outbound interface (the interface 1) corresponding to the spine3 in the direct next-hop entry. In addition, because the information about the outbound interface path corresponding to the direct next-hop index 1 may further correspond to another basic next-hop index, and a route prefix corresponding to the another basic next-hop index does not need to be withdrawn. Therefore, to ensure that the another route prefix may further maintain an association relationship with the information about the outbound interface path corresponding to the direct next-hop index 1, the leaf2 may allocate a new direct next-hop index to path information obtained after path information about some outbound interfaces is deleted. For example, the leaf2 allocates a direct next-hop index 2 to path information (that is, the next-hop address 192.168.4.1 and the interface 2) of an outbound interface after the next-hop address 192.168.3.1 and the interface 1 are deleted from the direct next-hop entry.

Specifically, refer to FIG. 11. FIG. 11 is a schematic diagram of an updated route entry according to an embodiment of this application. As shown in FIG. 11, after deleting the next-hop address 192.168.3.1 and the interface 1 from the path information about the outbound interface corresponding to the direct next-hop index 1, the leaf2 obtains the next-hop address 192.168.4.1 and the interface 2, and allocates the direct next-hop index 2 to the next-hop address 192.168.4.1 and the interface 2. The path information about the outbound interface corresponding to the direct next-hop index 2 includes only the interface 2 and the next-hop address 192.168.4.1.

It is assumed that the leaf1 is faulty. After the spine1 and the spine2 sense that the link is faulty, the spine1 sends a route withdraw message 1 to the super spine1, and the spine2 sends a route withdraw message 2 to the super spine1. Both the route withdraw message 1 and the route withdraw message 2 include an identifier (that is, 1.1.1.1/32) of the leaf1. Finally, both the route withdraw message 1 and the route withdraw message 2 are transferred to the leaf2. After receiving the route withdraw message 1 and the route withdraw message 2, the leaf2 determines, based on the route withdraw message 1 and the route withdraw message 2, the to-be-deleted path information about the outbound interface corresponding to the route prefix 1.1.1.1/32. Based on the to-be-deleted path information about the outbound interface, the leaf2 deletes a next-hop address (192.168.3.1) of the spine3, an outbound interface (interface 1) corresponding to the spine3, a next-hop address (192.168.4.1) of the spine4, and an outbound interface (interface 2) corresponding to the spine4 in the direct next-hop entry. After the path information about the outbound interface is deleted, it can be found that no local outbound interface on the leaf2 can reach the route prefix 1.1.1.1/32. That is, the route prefix 1.1.1.1/32 is unreachable. Therefore, the leaf2 may delete all route entries related to the route prefix 1.1.1.1/32.

Figures 12, 13:
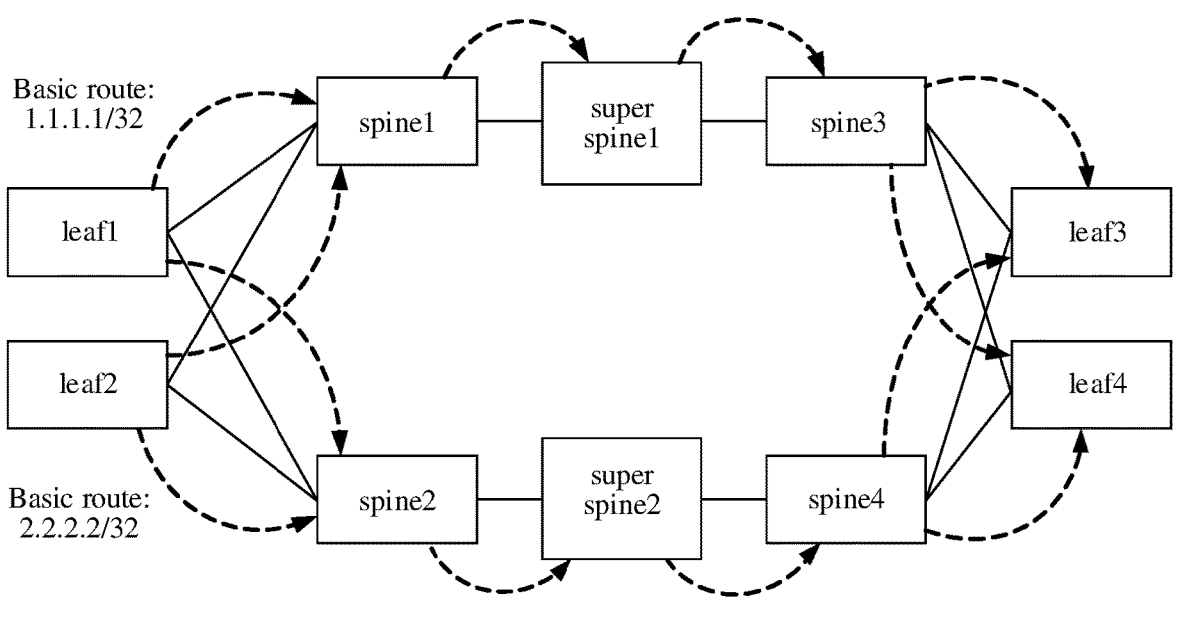
FIG. 12 is a schematic diagram of another network system according to an embodiment of this application.
FIG. 13 is a schematic diagram of another route entry according to an embodiment of this application.

Refer to FIG. 12. FIG. 12 is a schematic diagram of another network system according to an embodiment of this application. As shown in FIG. 12, the network system includes a leaf1, a leaf2, a spine1, a super spine1, a spine3, a spine2, a super spine2, a spine4, a leaf3 and a leaf4. Each network device in the network system may advertise a basic route whose route prefix is an identifier of the network device. Using the leaf1 and the leaf2 as an example, it is assumed that an identifier of the leaf1 is 1.1.1.1/32, and an identifier of the leaf2 is 2.2.2.2/32. The leaf1 sends basic routes with the route prefix 1.1.1.1/32 to the spine1 and the spine2 respectively, and the leaf2 sends basic routes with the route prefix 2.2.2.2/32 to the spine1 and the spine2 respectively. In this way, basic routes sent by the leaf1 and the leaf2 to the spine1 sequentially pass through the spine1, the super spine1, and the spine3, and reach the leaf3; basic routes sent by the leaf1 and the leaf2 to the spine2 sequentially pass through the spine2, the super spine2, and the spine4, and reach the leaf3. In other words, the leaf3 may receive a basic route whose route prefix is 1.1.1.1/32 and a basic route whose route prefix is 2.2.2.2/32 from spine3 and spine4, respectively.

It is assumed that an address of an interface that connects the spine3 to the leaf3 is 192.168.5.1, and a next-hop address of a basic route forwarded by the spine3 to the leaf3 is 192.168.5.1. It is assumed that an interface that connects the leaf3 to the spine3 is an interface 3, and the leaf3 searches a route table based on the next-hop address 192.168.5.1, and obtains that a corresponding outbound interface is the interface 3.

Similarly, it is assumed that an address of an interface that connects the spine4 to the leaf3 is 192.168.6.1, and a next-hop address of a basic route forwarded by the spine4 to the leaf3 is 192.168.6.1. It is assumed that an interface that connects the leaf3 to the spine4 is an interface 4, and the leaf3 searches a route table based on the next-hop address 192.168.6.1, and obtains that a corresponding outbound interface is the interface 4.

In this way, based on the basic routes received from the spine3 and the spine4, the leaf3 may generate a corresponding route entry. For details, refer to FIG. 13. FIG. 13 is a schematic diagram of another route entry according to an embodiment of this application. As shown in FIG. 13, the route entry generated by the leaf3 includes the route entries in Table 7, Table 8, and Table 9. Table 7 includes a route prefix 1.1.1.1/32 and a basic next-hop index Index 1, as well as a route prefix 2.2.2.2/32 and a basic next-hop index Index 2. Table 8 includes a basic next-hop index Index 1 and a direct next-hop index 1, as well as a basic next-hop index Index 2 and a direct next-hop index 1. Table 9 includes information about a direct next-hop index 1 and two outbound interface paths. The information about the two outbound interface paths respectively includes that an outbound interface is an interface 3 and a next-hop address is 192.168.5.1, and that an outbound interface is an interface 4 and a next-hop address is 192.168.6.1.

After the leaf1 and the leaf2 advertise basic routes, the leaf1 and the leaf2 import a plurality of routes with the same prefix from the outside. In this example, both the leaf1 and the leaf import two routes. The route prefixes of the two routes are 10.1.1.0/24 and 11.1.1.0/24, respectively. The leaf1 adds an identifier of leaf1 (that is, 1.1.1.1/32) to the two imported routes, to obtain two service routes whose route prefixes are 10.1.1.0/24 and 11.1.1.0/24 respectively. The leaf2 adds an identifier of leaf2 (that is, 2.2.2.2/32) to the two imported routes, to obtain two service routes whose route prefixes are 10.1.1.0/24 and 11.1.1.0/24 respectively. Then, the leaf1 sends the generated two service routes to the spine1 and the spine2 respectively, and the leaf2 also sends the generated two service routes to the spine1 and the spine2 respectively. Finally, the leaf3 may receive, from spine3 and spine4 respectively, service routes whose route prefixes are 10.1.1.0/24 and 11.1.1.0/24 and that are advertised by the leaf1 as well as service routes whose route prefixes are 10.1.1.0/24 and 11.1.1.0/24 and that are advertised by the leaf2.

Simply speaking, the leaf3 receives four service routes with a route prefix of 10.1.1.0/24 in total, which are respectively a service route 1, a service route 2, a service route 3, and a service route 4. The service route 1 is received by the leaf3 from the spine3, and a route prefix of a basic route on which the service route 1 depends is 1.1.1.1/32. The service route 2 is received by the leaf3 from the spine4, and a route prefix of a basic route on which the service route 2 depends is also 1.1.1.1/32. That is, both the service route 1 and the service route 2 are advertised by the leaf1. The service route 3 is received by the leaf3 from the spine3, and a route prefix of a basic route on which the service route 3 depends is 2.2.2.2/32. The service route 4 is received by the leaf3 from the spine4, and a route prefix of a basic route on which the service route 4 depends is 2.2.2.2/32. That is, both the service route 3 and the service route 4 are advertised by the leaf2. Similarly, the leaf3 receives four service routes with a route prefix of 11.1.1.0/24 in total.

That is, for a packet whose route prefix is 10.1.1.0/24 or 11.1.1.0/24, the leaf3 may forward the packet based on the route prefix 1.1.1.1/32 and the information about the outbound interface path corresponding to 2.2.2.2/32. In this way, the leaf3 may determine that the information about the outbound interface path corresponding to the route prefix 10.1.1.0/24 and the route prefix 11.1.1.0/24 is a set of the information about the outbound interface corresponding to the route prefix 1.1.1.1/32 and the information about the outbound interface corresponding to the route prefix 2.2.2.2/32.

For details, refer to FIG. 14. FIG. 14 is a schematic diagram of another route entry according to an embodiment of this application. As shown in FIG. 14, a route entry generated by the leaf3 based on the service route is in Table 7. Because the information about the outbound interface corresponding to the route prefix 10.1.1.0/24 and the route prefix 11.1.1.0/24 is a set of the information about the outbound interface corresponding to the route prefix 1.1.1.1/32 and the information about the outbound interface corresponding to the route prefix 2.2.2.2/32, the leaf3 may allocate a new basic next-hop index, that is, Index 3, to the route prefix 10.1.1.0/24 and the route prefix 11.1.1.0/24. In Table 7, both route prefixes 10.1.1.0/24 and 11.1.1.0/24 of the service route are associated with the basic next-hop index Index 3. In addition, the Index 3 corresponds to the direct next-hop indexes corresponding to the Index 1 and the Index 2. In this way, the Index 3 may be associated with the information about the outbound interface path corresponding to the Index 1 and the Index 2. In addition, to facilitate subsequent route convergence, in Table 8, even if the direct next-hop indexes corresponding to the Index 1 and Index 2 are the same (that is, the direct next-hop indexes are both 1), the Index 3 is recorded as being associated with the direct next-hop indexes corresponding to Index 1 and Index2 respectively. In this way, when the information about the outbound interface path corresponding to the Index 1 or the Index 2 changes due to a subsequent link fault, for a route entry corresponding to the service route, the leaf3 may modify only a direct next-hop index corresponding to the Index 3 in Table 8.

It is assumed that after the leaf3 generates the route entry in FIG. 14, the link between the leaf1 and the spine1 is faulty. After the spine1 senses the link fault, the spine1 sends a route withdraw message to the super spine1, where the route withdraw message includes an identifier (that is, 1.1.1.1/32) of the leaf1. After the route withdraw message is transferred to the spine3 through the super spine1, the spine3 transfers the route withdraw message to the leaf3. After receiving the route withdraw message, the leaf3 updates, based on the route withdraw message, the path information about the outbound interface corresponding to the basic route 1.1.1.1/32. Because the outbound interface corresponding to the basic route 1.1.1.1/32 is only an interface (that is, an interface 4) connecting the leaf3 to the spine4, it is necessary to reallocate a direct next-hop index (for example, allocating a direct next-hop index as 1000) to updated path information about an outbound interface corresponding to the basic route 1.1.1.1/32. Therefore, the leaf3 needs to update Table 8 and Table 9 based on the updated path information about the outbound interface, and updated entries are shown in FIG. 15. FIG. 15 is a schematic diagram of an updated route entry according to an embodiment of this application. As shown in FIG. 15, after deleting the next-hop address 192.168.5.1 and the interface 3 from the path information about the outbound interface corresponding to the direct next-hop index 1, the leaf3 obtains the next-hop address 192.168.6.1 and the interface 4, and allocates the direct next-hop index 1000 to the next-hop address 192.168.6.1 and the interface 4. The path information about the outbound interface corresponding to the direct next-hop index 1000 includes only the interface 4 and the next-hop address 192.168.6.1. It may be understood that, because the information about the outbound interface path corresponding to the direct next-hop index 1 may further correspond to another basic next-hop index, and a route prefix corresponding to the another basic next-hop index does not need to be withdrawn. Therefore, to ensure that another route prefix may further maintain an association relationship with the information about the outbound interface path corresponding to the direct next-hop index 1, the leaf3 may allocate a new direct next-hop index to the next-hop address 192.168.6.1 and the interface 4. For example, the leaf3 allocates the direct next-hop index 1000 to the next-hop address 192.168.6.1 and the interface 4.

Figures 16, 17:
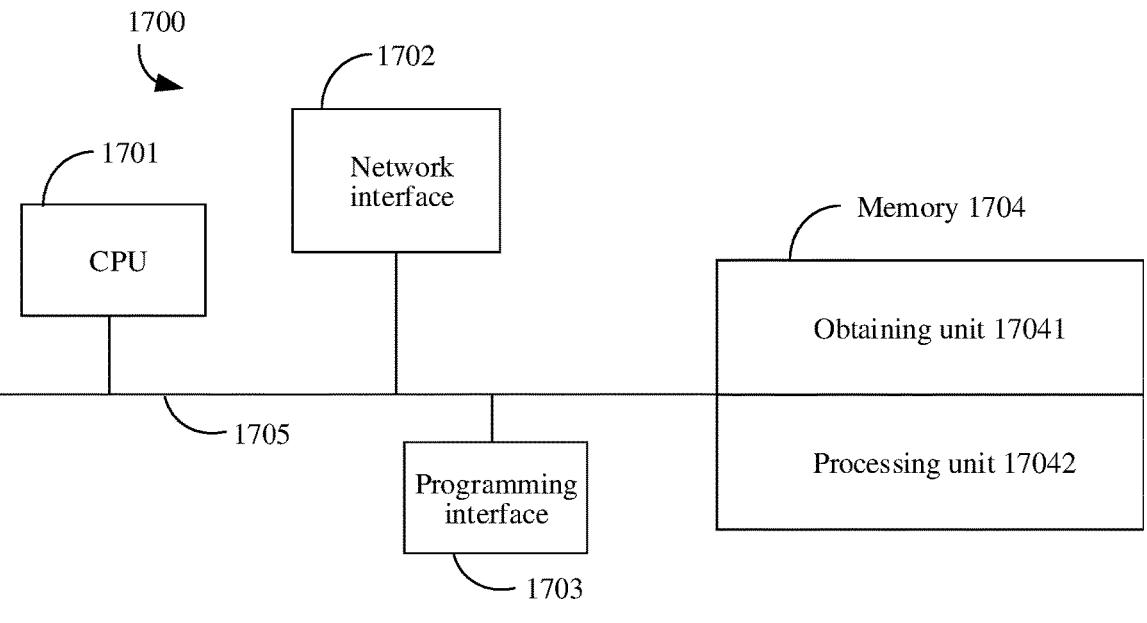
FIG. 16 is a schematic diagram of an updated route entry according to an embodiment of this application.
FIG. 17 is a schematic diagram of a structure of a network device 1700 according to an embodiment of this application.

It is assumed that after the leaf3 generates a route entry in FIG. 14, the leaf1 is faulty, and after the spine1 and the spine2 sense a link fault, the spine1 sends a route withdraw message 3 to the super spine1, and the spine2 sends a route withdraw message 4 to the super spine1. Both the route withdraw message 3 and the route withdraw message 4 include an identifier (that is, 1.1.1.1/32) of the leaf1. Finally, both the route withdraw message 3 and the route withdraw message 4 are transferred to the leaf3. After receiving the route withdraw message 3 and the route withdraw message 4, the leaf3 determines, based on the route withdraw message 3 and the route withdraw message 4, the to-be-deleted path information about the outbound interface corresponding to the route prefix 1.1.1.1/32. Based on the to-be-deleted path information about the outbound interface, it can be found that no local outbound interface on the leaf3 can reach the route prefix 1.1.1.1/32. That is, the route prefix 1.1.1.1/32 is unreachable. Therefore, the leaf3 may delete all route entries related to the route prefix 1.1.1.1/32. In addition, because the Index3 is associated with the direct next-hop indexes corresponding to the Index 1 and the Index 2, after all route entries related to the route prefix 1.1.1.1/32 are deleted (that is, all route entries related to the Index 1 are deleted), it is found that the Index 3 is associated with only the direct next-hop index corresponding to the Index 2. Therefore, basic next-hop indexes corresponding to a route prefix 10.1.1.0/32 and a route prefix 11.1.1.0/32 can be modified to the Index 2 and the route entries related to the Index 3 can be deleted. Specifically, refer to FIG. 16. FIG. 16 is a schematic diagram of an updated route entry according to an embodiment of this application. FIG. 16 is a schematic diagram obtained after a route entry is updated based on FIG. 14. As shown in FIG. 16, compared with FIG. 14, in Table 7, a route entry related to the route prefix 1.1.1.1/32 is deleted, and basic next-hop indexes corresponding to the route prefix 10.1.1.0/32 and the route prefix 10.1.1.0/32 are modified to the Index 2. In Table 8, an index entry corresponding to the basic next-hop index Index 1 corresponding to the route prefix 1.1.1.1/32 is deleted, and an index entry corresponding to the basic next-hop index Index 3 is also deleted.

It should be understood that the route entry in embodiments of this application may be generated by a control plane in the network device and delivered to a forwarding plane. The forwarding plane in the network device stores the foregoing route entries (for example, the route entries shown in FIG. 4 to FIG. 16), to subsequently guide packet forwarding. In other words, the foregoing route entries are entries in a forwarding table of the forwarding plane.

To implement the foregoing embodiments, this application further provides a network device. Refer to FIG. 17. FIG. 17 is a schematic diagram of a structure of a network device 1700 according to an embodiment of this application.

Although the network device 1700 shown in FIG. 17 shows some specific features, a person skilled in the art may be aware from embodiments of this application that, for brevity, FIG. 17 does not show various other features, to avoid confusing more related aspects of the implementations disclosed in embodiments of this application. For this purpose, as an example, in some implementations, the network device 1700 includes one or more processing units (such as a CPU) 1701, a network interface 1702, a programming interface 1703, a memory 1704, and one or more communication buses 1705 configured to interconnect various components. In some other implementations, some functional components or units may be omitted or added to the network device 1700 based on the foregoing examples.

In some implementations, the network interface 1702 is configured to connect to one or more other network devices/servers in the network system. In some implementations, the communication bus 1705 includes a circuit that interconnects and controls communication between system components. The memory 1704 may include a non-volatile memory, for example, a read only memory (ROM), a programmable read only memory (PROM), an erasable programmable read only memory (erasable PROM, EPROM), an electrically erasable programmable read only memory (electrically EPROM, EEPROM), or a flash memory. The memory 1704 may also include a volatile memory. The volatile memory may be a random access memory (RAM), which is used as an external cache.

In some implementations, a non-transitory computer-readable storage medium of the memory 1704 or the memory 1704 stores the following programs, modules, and data structures, or a subset thereof, and for example, includes a transceiver unit (not shown), an obtaining unit 17041, and a processing unit 17042.

In a possible embodiment, the network device 1700 may have any function of the first network device in the method embodiment corresponding to FIG. 2.

It should be understood that the network device 1700 corresponds to the first network device in the foregoing method embodiment, and the modules in the network device 1700 and the foregoing other operations and/or functions are respectively used to implement various steps and methods implemented by the first network device in the foregoing method embodiment. For specific details, refer to the foregoing method embodiment corresponding to FIG. 2. For brevity, details are not described herein again.

It should be understood that, in this application, the network interface 1702 on the network device 1700 may complete a data receiving and sending operation, or the processor may invoke program code in the memory, and implement a function of the transceiver unit in cooperation with the network interface 1702 when required.

In various implementations, the network device 1700 is configured to perform the route processing method provided in embodiments of this application, for example, to perform the route processing method corresponding to the embodiment shown in FIG. 2.

Figure 18:
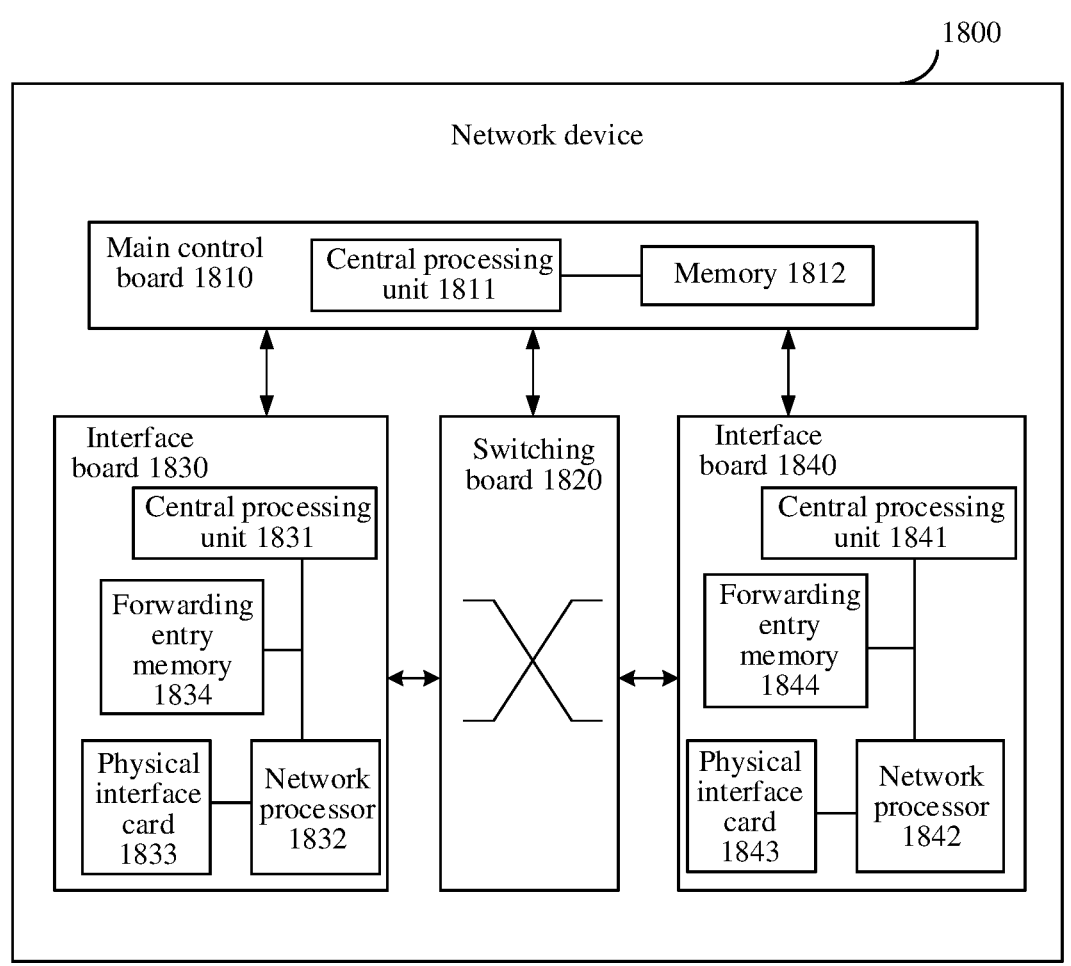
FIG. 18 is a schematic diagram of a structure of a network device 1800 according to an embodiment of this application.

A specific structure of the network device described in FIG. 17 of this application may be shown in FIG. 18.

FIG. 18 is a schematic diagram of a structure of a network device 1800 according to an embodiment of this application.

The network device 1800 includes a main control board 1810 and an interface board 1830.

The main control board 1810 is also referred to as a main processing unit (MPU) or a route processor. The main control board 1810 is configured to control and manage components in the network device 1800, including route calculation, device management, device maintenance, and protocol processing functions. The main control board 1810 includes a central processing unit 1811 and a memory 1812.

The interface board 1830 is also referred to as a line processing unit (LPU), a line card, or a service board. The interface board 1830 is configured to provide various service interfaces, and forward a data packet. Service interfaces include but are not limited to Ethernet interfaces and packet over SONET/SDH (Packet over SONET/SDH, POS) interfaces. The interface board 1830 includes a central processing unit 1831, a network processor 1832, a forwarding entry memory 1834, and a physical interface card (PIC) 1833.

The central processing unit 1831 on the interface board 1830 is configured to control and manage the interface board 1830, and communicate with the central processing unit 1811 on the main control board 1810.

The network processor 1832 is configured to implement packet forwarding processing. A form of the network processor 1832 may be a forwarding chip.

The physical interface card 1833 is configured to implement an interconnection function at a physical layer. An original traffic enters the interface board 1830 from the physical interface card, and a processed packet is sent from the physical interface card 1833. The physical interface card 1833 includes at least one physical interface. The physical interface is also referred to as a physical port, and the physical interface may be a flexible Ethernet (FlexE) physical interface. The physical interface card 1833, also referred to as a sub-card, may be installed on the interface board 1830, and is responsible for converting an optical/electrical signal into a packet, performing validity check on the packet, and forwarding the packet to the network processor 1832 for processing. In some embodiments, the central processing unit 1831 on the interface board 1830 may also perform a function of the network processor 1832, for example, implement software forwarding based on a general-purpose CPU. In this way, the interface board 1830 does not need the network processor 1832.

Optionally, the network device 1800 includes a plurality of interface boards. For example, the network device 1800 further includes an interface board 1840. The interface board 1840 includes a central processing unit 1841, a network processor 1842, a forwarding entry memory 1844, and a physical interface card 1843.

Optionally, the network device 1800 further includes a switching board 1820. The switching board 1820 may also be referred to as a switch fabric unit (SFU). In a case in which the network device has a plurality of interface boards 1830, the switching board 1820 is configured to complete data exchange between the interface boards. For example, the interface board 1830 and the interface board 1840 may communicate with each other over the switching board 1820.

The main control board 1810 is coupled with the interface board. For example, the main control board 1810, the interface board 183o and the interface board 1840, and the switching board 1820 are connected via a system bus and/or a system backplane to implement interworking. In a possible implementation, an inter-process communication protocol (IPC) channel is established between the main control board 1810 and the interface board 1830, and the main control board 1810 and the interface board 183o communicate with each other through the IPC channel.

Logically, the network device 1800 includes a control plane and a forwarding plane. The control plane includes the main control board 1810 and the central processing unit 1831. The forwarding plane includes components configured to perform forwarding, for example, the forwarding entry memory 1834, the physical interface card 1833, and the network processor 1832. The control plane performs functions such as advertising a route, generating a forwarding table, processing signaling and protocol packets, and configuring and maintaining a status of a device. The control plane delivers the generated forwarding table to the forwarding plane. On the forwarding plane, the network processor 1832 looks up and forwards a packet received by the physical interface card 1833 based on the forwarding table delivered by the control plane. The forwarding table delivered by the control plane may be stored in the forwarding entry memory 1834. In some embodiments, the control plane and the forwarding plane may be completely separated, and are not on a same device.

It should be understood that the transceiver unit in the network device 1700 may be equivalent to the physical interface card 1833 or the physical interface card 1843 in the network device 1800. The obtaining unit 17041 and the processing unit 17042 in the network device 1700 may be equivalent to the central processing unit 1811 or the central processing unit 1831 in the network device 1800, or may be equivalent to program code or an instruction stored in the memory 1812.

It should be understood that, in embodiments of this application, operations on the interface board 1840 are the same as operations on the interface board 1830. For brevity, details are not described again. It should be understood that the network device 1800 in this embodiment may correspond to the first network device in the foregoing method embodiments. The main control board 1810, the interface board 1830, and/or the interface board 1840 in the network device 1800 may implement the functions of the first network device and/or the steps implemented by the first network device in the foregoing method embodiments. For brevity, details are not described herein again.

It should be noted that, there may be one or more main control boards. When there are a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented through the switching board, to provide a large-capacity data exchange and processing capability. Optionally, the form of the network device may also be that there is only one card. In other words, there is no switching board, and functions of the interface board and the main control board are integrated on the one card. In this case, a central processing unit on the interface board and a central processing unit on the main control board may be combined into one central processing unit on the one card, to perform a function obtained after the two are superimposed. Which architecture is specifically used depends on a specific networking deployment scenario, and is not uniquely limited herein.

In some possible embodiments, the first network device mentioned above may be implemented as a virtualization device. The virtualization device may be a virtual machine (VM), a virtual router, or a virtual switch that runs a program for sending a packet. A virtualization device is deployed on a hardware device (for example, a physical server). For example, the first Network device may be implemented based on a general-purpose physical server in combination with a network functions virtualization (NFV) technology.

It should be understood that the network devices in the foregoing product forms respectively have any function of the first network device in the foregoing method embodiments, and details are not described herein.

Further, embodiments of this application further provide a computer program product. When the computer program product is running on a network device, the network device is enabled to perform the method performed by the first network device in the method embodiment corresponding to FIG. 2.

Embodiments of this application further provide a chip system, including a processor and an interface circuit. The interface circuit is configured to receive instructions and transmit the instructions to the processor. The processor is configured to implement the method in any one of the foregoing method embodiments.

Optionally, the chip system further includes a memory, and there may be one or more processors in the chip system. The processor may be implemented through hardware, or may be implemented through software. When the processor is implemented through the hardware, the processor may be a logic circuit, an integrated circuit, or the like. When the processor is implemented through software, the processor may be a general-purpose processor, and the method in any one of the foregoing method embodiments is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

The foregoing describes embodiments of this application in detail. Steps in the methods in embodiments of this application may be sequentially scheduled, combined, or deleted according to an actual requirement. Modules in the apparatus in embodiments of this application may be divided, combined, or deleted according to an actual requirement.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

What is claimed is:

1. A method, comprising:

obtaining, by a first network device, a first route, wherein a first route prefix of the first route comprises an identifier of a route advertiser;

generating, by the first network device, a first route entry based on the first route, wherein generating, by the first network device, the first route entry based on the first route comprises:

allocating, by the first network device, a basic next-hop index corresponding to the route advertiser, wherein the first route entry comprises the identifier of the route advertiser and the basic next-hop index;

obtaining, by the first network device, a second route, wherein the second route comprises a second route prefix and the identifier of the route advertiser; and generating, by the first network device, a second route entry based on the identifier of the route advertiser and the second route prefix, to associate the first route entry with the second route entry, wherein the basic next-hop index associates the first route entry and the second route entry.

2. The method according to claim 1, wherein:

the first route further comprises a first flag, and the first flag indicates that the first route is a basic route; and the second route further comprises a second flag, and the second flag indicates that the second route is a service route.

3. The method according to claim 1, wherein the first route entry comprises a first sub-route entry and a second sub-route entry, the first sub-route entry comprises the identifier of the route advertiser and the basic next-hop index, the second sub-route entry comprises the basic next-hop index and information about at least one outbound interface path, the information about the at least one outbound interface path comprises an outbound interface and a next-hop address, and the next-hop address is an Internet protocol (IP) address of an interface of a neighboring device connected to the outbound interface.

4. The method according to claim 3, wherein the second sub-route entry comprises an index entry and a next-hop entry, the index entry comprises the basic next-hop index and a direct next-hop index, and the next-hop entry comprises the direct next-hop index and the information about the at least one outbound interface path.

5. The method according to claim 4, further comprising:

obtaining, by the first network device, a route withdraw message, wherein the route withdraw message comprises the identifier of the route advertiser; and processing, by the first network device, the second sub-route entry based on the route withdraw message.

6. The method according to claim 5, wherein processing, by the first network device, the second sub-route entry based on the route withdraw message comprises:

deleting, by the first network device, the second sub-route entry when the second sub-route entry comprises the information about an outbound interface path; and deleting, by the first network device, information about an outbound interface path corresponding to the route withdraw message from the second sub-route entry when the second sub-route entry comprises information about a plurality of outbound interface paths.

7. The method according to claim 6, wherein the second route entry comprises the second route prefix and the basic next-hop index.

8. The method according to claim 1, wherein the identifier of the route advertiser is an internet protocol (IP) address of a loopback interface of the route advertiser.

9. The method according to claim 1, wherein obtaining, by the first network device, the first route comprises: receiving, by the first network device, an extended border gateway protocol message, wherein the extended border gateway protocol message comprises the first route.

10. The method according to claim 2, wherein the basic route is route whose route prefix includes an identifier of a route advertiser, and the service route includes an identifier of a route publisher, to indicate a basic route on which the service route depends.

11. A network device, comprising:

at least one processor; and a non-transitory computer readable storage medium storing a program that is executable by the at least one processor, the program including instructions to:

obtain a first route, wherein a first route prefix of the first route comprises an identifier of a route advertiser;

generate a first route entry based on the first route, wherein generating the first route entry based on the first route comprises:

allocating a basic next-hop index corresponding to the route advertiser, wherein the first route entry comprises the identifier of the route advertiser and the basic next-hop index;

obtain a second route, wherein the second route comprises a second route prefix and the identifier of the route advertiser; and generate a second route entry based on the identifier of the route advertiser and the second route prefix, to associate the first route entry with the second route entry, wherein the basic next-hop index associates the first route entry and the second route entry.

12. The network device according to claim 11, wherein:

the first route further comprises a first flag, and the first flag indicates that the first route is a basic route; and the second route further comprises a second flag, and the second flag indicates that the second route is a service route.

13. The network device according to claim 11, wherein the first route entry comprises a first sub-route entry and a second sub-route entry, the first sub-route entry comprises the identifier of the route advertiser and the basic next-hop index, the second sub-route entry comprises the basic next-hop index and information about at least one outbound interface path, the information about the at least one outbound interface path comprises an outbound interface and a next-hop address, and the next-hop address is an Internet protocol (IP) address of an interface of a neighboring device connected to the outbound interface.

14. The network device according to claim 13, wherein the second sub-route entry comprises an index entry and a next-hop entry, the index entry comprises the basic next-hop index and a direct next-hop index, and the next-hop entry comprises the direct next-hop index and the information about the at least one outbound interface path.

15. The network device according to claim 14, wherein the program further includes instructions to:

obtain a route withdraw message, wherein the route withdraw message comprises the identifier of the route advertiser; and process the second sub-route entry based on the route withdraw message.

16. The network device according to claim 15, wherein the program further includes instructions to:

delete the second sub-route entry when the second sub-route entry comprises the information about the at least one outbound interface path; and delete information about an outbound interface path corresponding to the route withdraw message from the second sub-route entry when the second sub-route entry comprises information about a plurality of outbound interface paths.

17. The network device according to claim 16, wherein the second route entry comprises the second route prefix and the basic next-hop index.

18. The network device according to claim 17, wherein the identifier of the route advertiser is an internet protocol (IP) address of a loopback interface of the route advertiser.

19. The network device according to claim 18, further comprising:

a transceiver, configured to receive an extended border gateway protocol message, wherein the extended border gateway protocol message comprises the first route.

20. The network device according to claim 12, wherein the basic route is route whose route prefix includes an identifier of a route advertiser, and the service route includes an identifier of a route publisher, to indicate a basic route on which the service route depends.

\* \* \* \* \*